United States Patent
Han et al.

(10) Patent No.: US 9,025,560 B2
(45) Date of Patent: May 5, 2015

(54) METHOD AND DEVICE FOR TRANSMITTING CONTROL INFORMATION IN A WIRELESS COMMUNICATION SYSTEM

(75) Inventors: Seung Hee Han, Anyang-si (KR); Hyun Soo Ko, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/642,848

(22) PCT Filed: Apr. 21, 2011

(86) PCT No.: PCT/KR2011/002881
§ 371 (c)(1),
(2), (4) Date: Dec. 27, 2012

(87) PCT Pub. No.: WO2011/132963
PCT Pub. Date: Oct. 27, 2011

(65) Prior Publication Data
US 2013/0107854 A1 May 2, 2013

Related U.S. Application Data

(60) Provisional application No. 61/326,628, filed on Apr. 21, 2010.

(30) Foreign Application Priority Data

Dec. 16, 2010 (KR) .......................... 10-2010-0129071

(51) Int. Cl.
 *H04W 72/04* (2009.01)
 *H04L 5/00* (2006.01)
 *H04L 27/26* (2006.01)
 *H04B 7/06* (2006.01)

(52) U.S. Cl.
CPC ......... *H04W 72/0413* (2013.01); *H04L 5/0053* (2013.01); *H04L 27/2633* (2013.01); *H04L 27/2636* (2013.01); *H04B 7/0669* (2013.01); *H04B 7/0671* (2013.01)

(58) Field of Classification Search
None
See application file for complete search history.

(56) References Cited

U.S. PATENT DOCUMENTS

| 2007/0014272 | A1* | 1/2007 | Palanki et al. | ................. | 370/344 |
| 2008/0090528 | A1* | 4/2008 | Malladi | ........................... | 455/70 |

(Continued)

FOREIGN PATENT DOCUMENTS

| CN | 101502034 | 8/2009 |
| WO | 2008006088 | 1/2008 |

(Continued)

OTHER PUBLICATIONS

PCT International Application No. PCT/KR2011/002881, Written Opinion of the International Searching Authority dated Nov. 23, 2011, 18 pages.

(Continued)

*Primary Examiner* — Ian N Moore
*Assistant Examiner* — Lakeram Jangbahadur
(74) *Attorney, Agent, or Firm* — Lee, Hong, Degerman, Kang & Waimey

(57) ABSTRACT

The present invention relates to a wireless communication system. More particularly, the present invention relates to a method for transmitting control information through a PUCCH in a wireless system and to a device therefore, the method comprising the following steps: receiving a first modulation symbol and a second modulation symbol from the control information; diffusing in a frequency domain, the first modulation symbol to a plurality of subcarriers; diffusing in a time domain, the first modulation symbol diffused in the frequency domain to a plurality of contiguous first SC-FDMA symbols; diffusing in the frequency domain, the second modulation symbol to a plurality of subcarriers; diffusing in the time domain, the second modulation symbol diffused in the frequency domain to the plurality of contiguous first SC-FDMA symbols; and transmitting the diffused first modulation symbol and the second modulation symbol through the PUCCH.

14 Claims, 30 Drawing Sheets

(56) References Cited

U.S. PATENT DOCUMENTS

| | | | | |
|---|---|---|---|---|
| 2008/0279170 | A1* | 11/2008 | Malladi et al. | 370/343 |
| 2009/0129259 | A1* | 5/2009 | Malladi et al. | 370/210 |
| 2009/0175159 | A1* | 7/2009 | Bertrand et al. | 370/203 |
| 2009/0196229 | A1* | 8/2009 | Shen et al. | 370/328 |

FOREIGN PATENT DOCUMENTS

| | | |
|---|---|---|
| WO | 2008137963 | 11/2008 |
| WO | 2010018970 | 2/2010 |

OTHER PUBLICATIONS

Nakao, et al., "Performance enhancement of E-UTRA uplink control channel in fast fading environments", IEEE, Apr. 2009, 5 pages.

European Patent Office Application Serial No. 11772251.2, Search Report dated Feb. 18, 2014, 6 pages.

The State Intellectual Property Office of the People's Republic of China Application Serial No. 200980109358.5, Office Action dated Nov. 26, 2012, 7 pages.

\* cited by examiner

FIG. 5
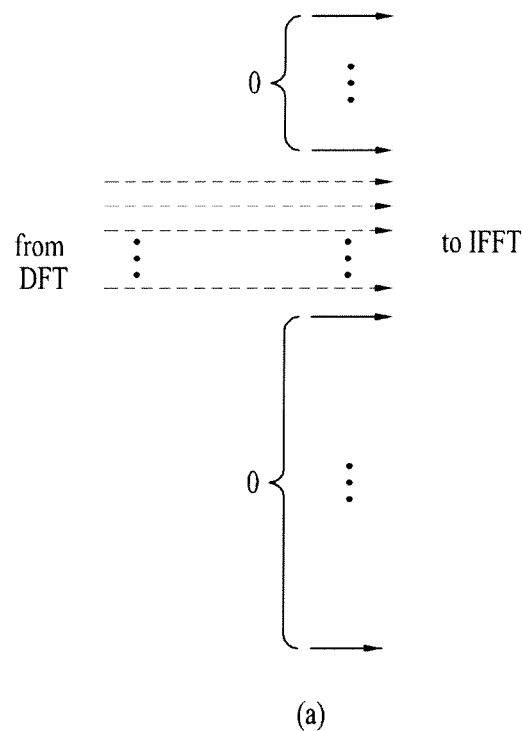
(a)
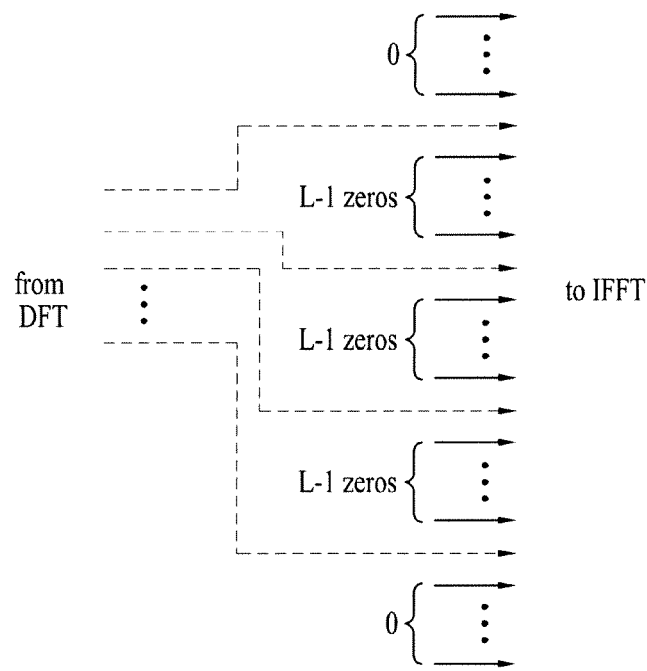
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 17

Resource allocation: 18 ACK/NACK channels with normal CP $\wedge \Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{OC}=0$ | $\bar{n}_{OC}=1$ | $\bar{n}_{OC}=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | 13 | | 6 | 13 |
| 3 | 2 | 1 | 7 | 14 | 1 | 7 | 14 |
| 4 | 3 | 2 | 8 | 15 | 2 | 8 | 15 |
| 5 | 4 | 3 | 9 | 16 | 3 | 9 | 16 |
| 6 | 5 | 4 | 10 | 17 | 4 | 10 | 17 |
| 7 | 6 | 5 | 11 | | 5 | 11 | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \begin{cases} \{1,2,3\} \text{ for normal cyclic prefix} \\ \{1,2,3\} \text{ for extended cyclic prefix} \end{cases}$ $\delta_{offset}^{PUCCH} \in \{0,1,...,\Delta_{shift}^{PUCCH}-1\}$ Cell specific cyclic shift offset $n_{OC}$    Orthogonal sequence index for ACK/NACK
$\bar{n}_{OC}$    Orthogonal sequence index for RS
$n_{CS}$    Cyclic shift value of a CAZAC sequence
$n'$    ACK/NACK resource index used for the channelization in a RB Cell-specific Cyclic shift value of CAZAC sequence

METHOD AND DEVICE FOR TRANSMITTING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/002881, filed on Apr. 21, 2011, which claims the benefit of earlier filing date and right of priority to Korean Patent Application No. 10-2010-0129071, filed on Dec. 16, 2010, and also claims the benefit of U.S. Provisional Application Ser. No. 61/326,628, filed on Apr. 21, 2010, the contents of which are all hereby incorporated by reference herein in their entirety.

TECHNICAL FIELD

The present invention relates to a wireless communication system, and more particularly to a method and apparatus for transmitting control information in a wireless communication system supporting carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for efficiently transmitting control information (channel) in a wireless communication system that substantially obviate one or more problems due to limitations and disadvantages of the related art. An object of the present invention is to provide a method and apparatus for efficiently transmitting control information (channel) in a wireless communication system. Another object of the present invention is to provide a channel format and signal processing for effectively transmitting control information, and an apparatus for the channel format and the signal processing. A further object of the present invention is to provide a method and apparatus for effectively allocating resources for transmitting control information.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting control information through a Physical Uplink Control Channel (PUCCH) by a user equipment (UE) in a wireless communication system, the method including: obtaining a first modulation symbol and a second modulation symbol from the control information; spreading the first modulation symbol to a plurality of subcarriers in a frequency domain; spreading the first modulation symbol spread in the frequency domain to a plurality of first contiguous SC-FDMA symbols in a time domain; spreading the second modulation symbol to a plurality of subcarriers in a frequency domain; spreading the second modulation symbol spread in the frequency domain to the plurality of first contiguous SC-PUMA symbols in a time domain; and transmitting the spread first modulation symbol and the spread second modulation symbol through the PUCCH.

In another aspect of the present invention, a user equipment (UE) configured to transmit control information through a physical uplink control channel (PUCCH) in a wireless communication system includes: a radio frequency (RF) unit; and a processor. The processor obtains a first modulation symbol and a second modulation symbol from the control information, spreads the first modulation symbol to a plurality of subcarriers in a frequency domain, spreads the first modulation symbol spread in the frequency domain to a plurality of first contiguous SC-FDMA symbols in a time domain, spreads the second modulation symbol to a plurality of subcarriers in a frequency domain, spreads the second modulation symbol spread in the frequency domain to the plurality of first contiguous SC-FDMA symbols in a time domain, and transmits the spread first modulation symbol and the spread second modulation symbol through the PUCCH.

A frequency spreading sequence, which is used to spread the first modulation symbol and the second modulation symbol in the frequency domain, may be generated by a combination of a base sequence and a cyclic shift.

A first frequency spreading sequence for use in the first modulation symbol and a second frequency spreading sequence for use in the second modulation symbol may have the same base sequence and different cyclic shift values.

A time spreading sequence, which is used to spread the first modulation symbol and the second modulation symbol in the time domain, includes an orthogonal code, and the same orthogonal code is applied to the first modulation symbol and the second modulation symbol.

The method may further include transmitting the first modulation symbol and the second modulation symbol through multiple antennas, wherein precoding for use in a space-code domain is applied to the first modulation symbol and the second modulation symbol.

The method may further include: obtaining a third modulation symbol and a fourth modulation symbol from the control information; spreading the third modulation symbol to a plurality of subcarriers in the frequency domain; spreading the third modulation symbol spread in the frequency domain to a plurality of second contiguous SC-FDMA symbols in the time domain; spreading the fourth modulation symbol to a plurality of subcarriers in the frequency domain; spreading the fourth modulation symbol spread in the frequency domain to the plurality of second contiguous SC-FDMA symbols in the time domain; and transmitting the spread third modulation symbol and the spread fourth modulation symbol through the PUCCH, wherein the plurality of first contiguous SC-FDMA symbol and the plurality of second contiguous SC-FDMA symbols are located in the same slot.

Advantageous Effects

Exemplary embodiments of the present invention have the following effects. Control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a signal mapping scheme in a frequency domain so as to satisfy single carrier characteristics.

FIG. 17 is a diagram showing ACK/NACK channelization of PUCCH formats 1a and 1b.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (CPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
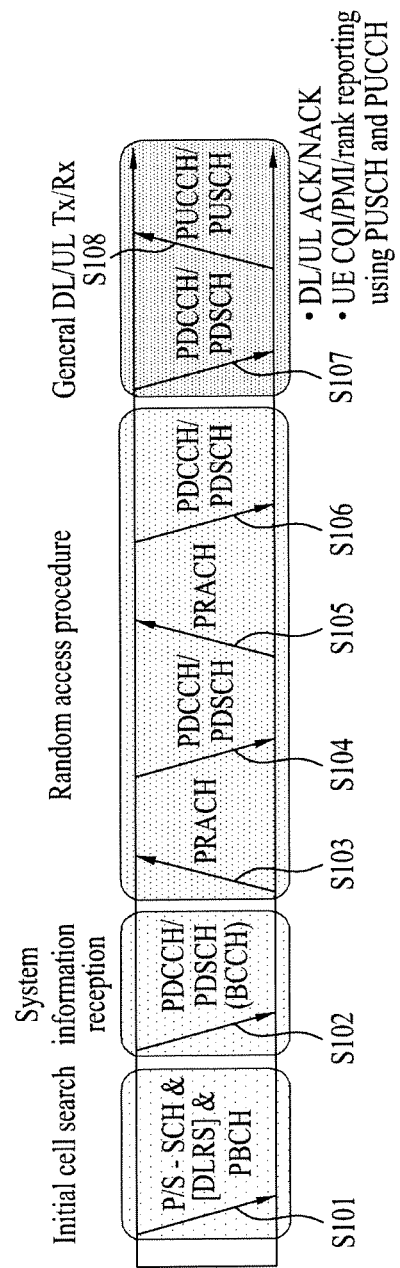
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
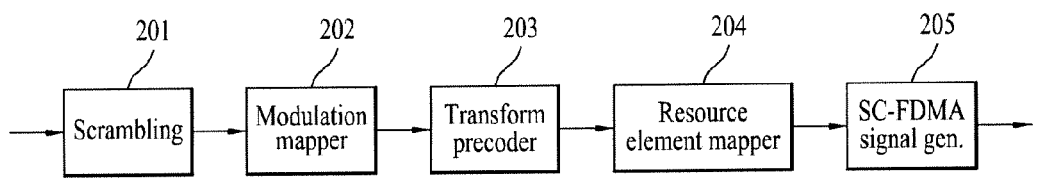
FIG. 2 is a conceptual diagram illustrating a method for processing an uplink signal.

FIG. 2 is a conceptual diagram illustrating a signal processing method for transmitting an uplink signal by a user equipment (UE).

Referring to FIG. 2, the scrambling module 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3:
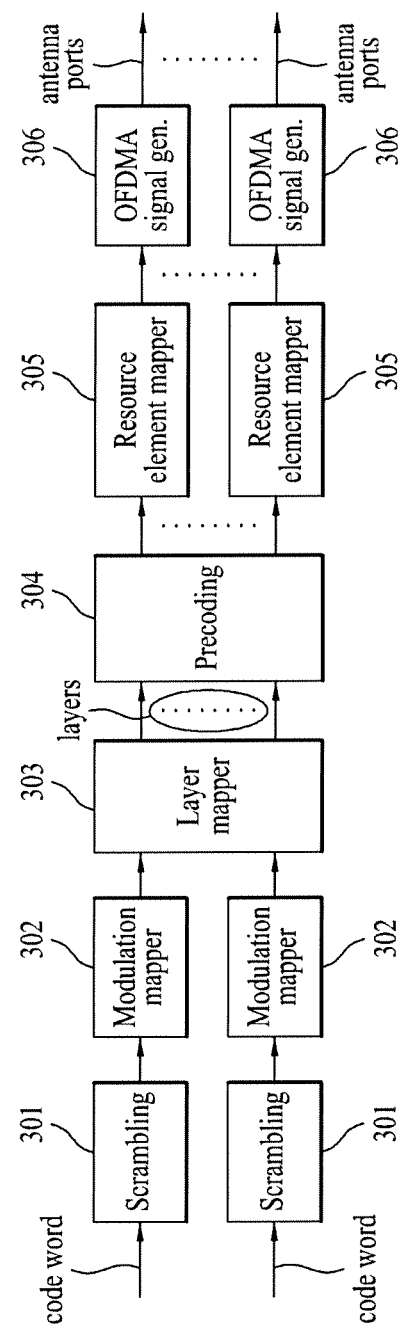
FIG. 3 is a conceptual diagram illustrating a method for processing a downlink signal.

FIG. 3 is a conceptual diagram illustrating a signal processing method for transmitting a downlink signal by a base station (BS).

Referring to FIG. 3, the BS can transmit one or more codewords via a downlink in a 3GPP LTE system. Codewords may be processed as complex symbols by the scrambling module 301 and the modulation mapper 302 in the same manner as in the uplink operation shown in FIG. 2. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a wireless communication system transmits an uplink signal, a Peak to Average Power Ratio (PAPR) may become more serious than in the case where the BS transmits a downlink signal. Thus, as described in FIGS. 2 and 3, the SC-FDMA scheme is used for uplink signal transmission in a different way from the OFDMA scheme used for downlink signal transmission.

Figure 4:
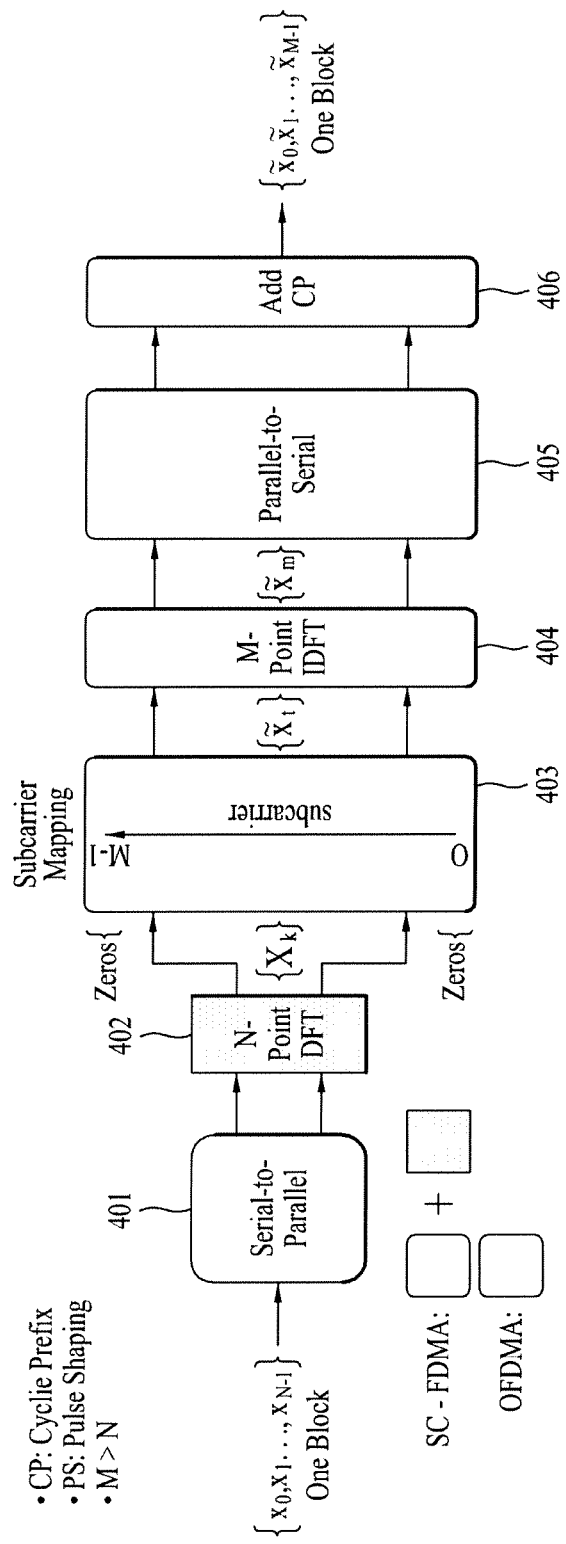
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

FIG. 5 illustrates a signal mapping scheme in the frequency domain for satisfying the single carrier properties. FIG. 5(a) shows a localized mapping scheme and FIG. 5(b) shows a distributed mapping scheme.

A clustered SC-FDMA scheme which is a modified form of the SC-FDMA scheme is described as follows. In the clustered SC-FDMA scheme, DFT process output samples are divided into sub-groups in a subcarrier mapping procedure and are non-contiguously mapped in the frequency domain (or subcarrier domain).

Figure 6:
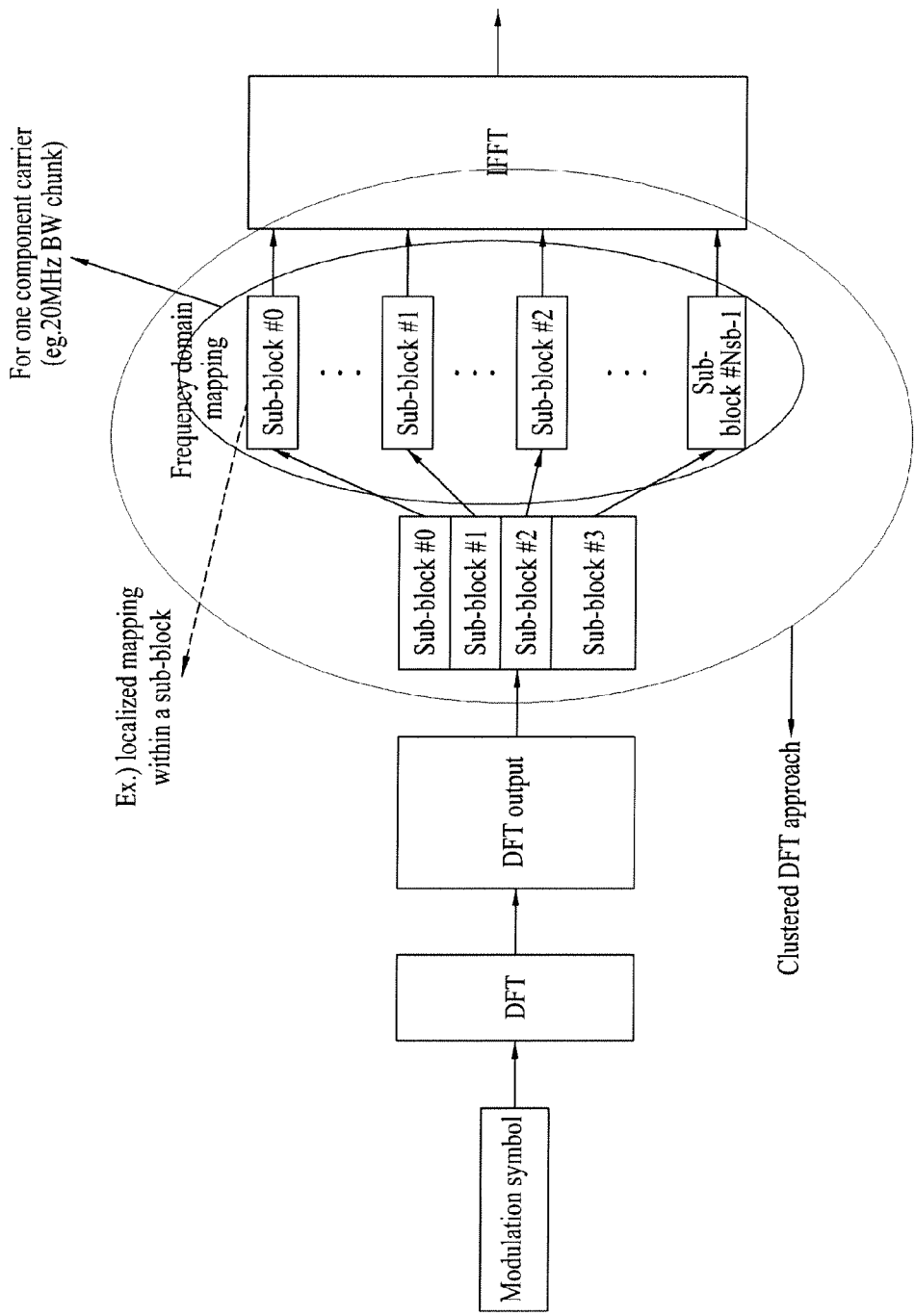
FIG. 6 is a conceptual diagram illustrating the signal processing for mapping DFT process output samples to a single carrier in a clustered SC-FDMA.
Figure 7:
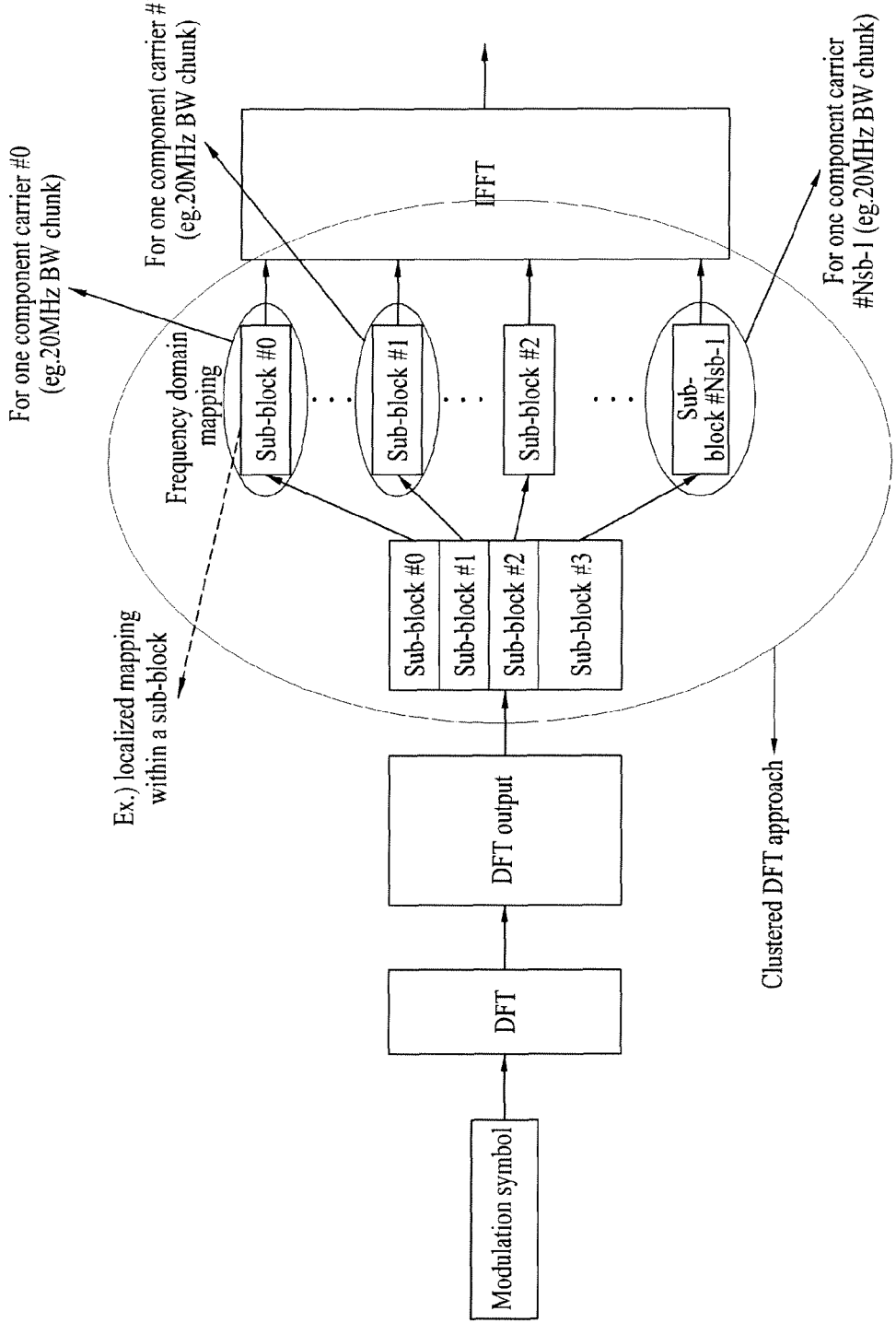
FIGS. 7 and 8 show the signal processing in which DFT process output samples are mapped to multiple carriers in a clustered SC-FDMA.
Figure 8:
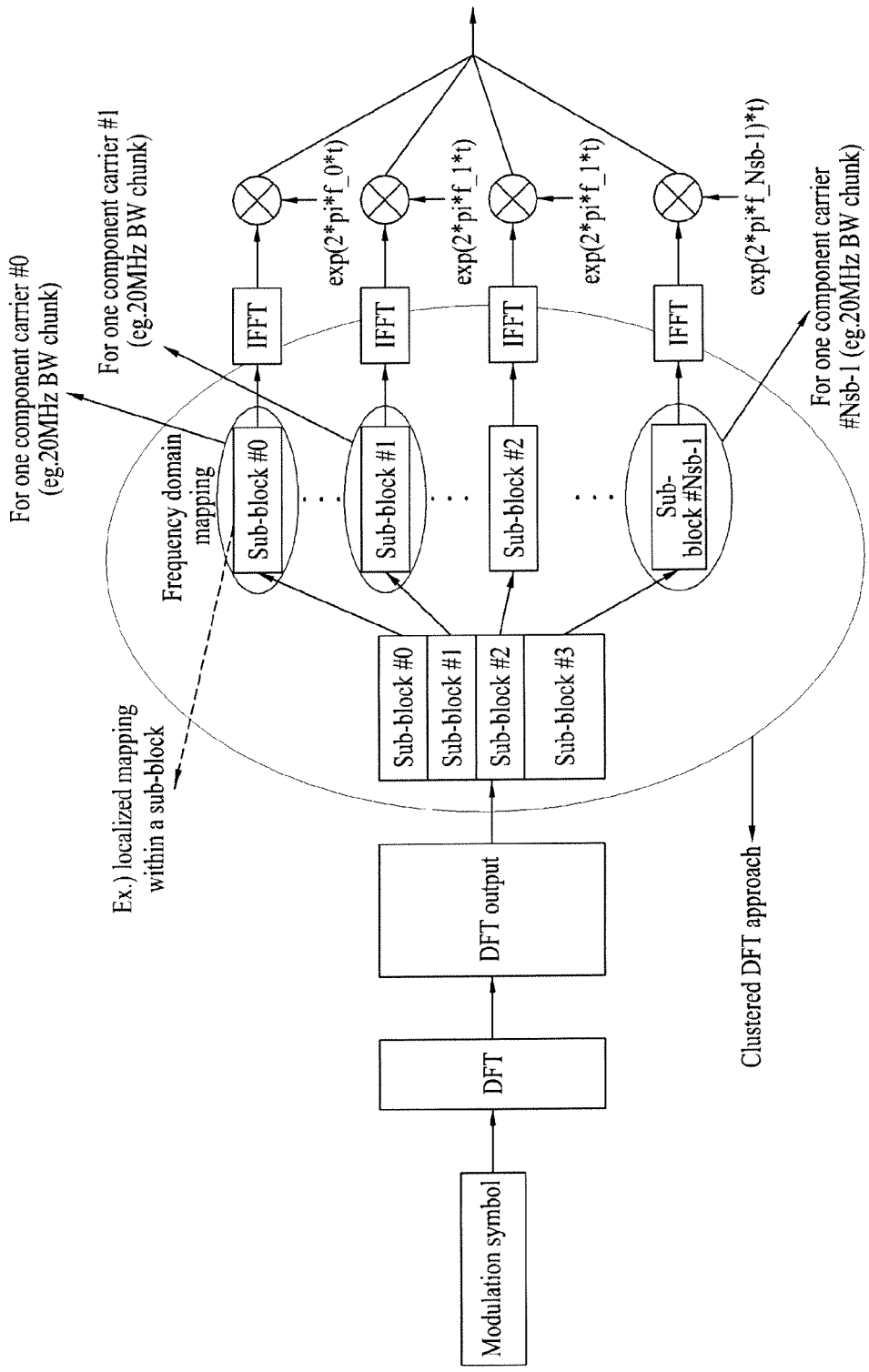

FIG. 6 shows signal processing in which DFT-process output samples are mapped to one carrier in the clustered SC-FDMA. FIGS. 7 and 8 show signal processing in which DFT process output samples are mapped to multicarriers in a clustered SC-FDMA. FIG. 6 shows the example of intra-carrier cluster SC-FDMA application. FIGS. 7 and 8 show examples of the inter-carrier clustered SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
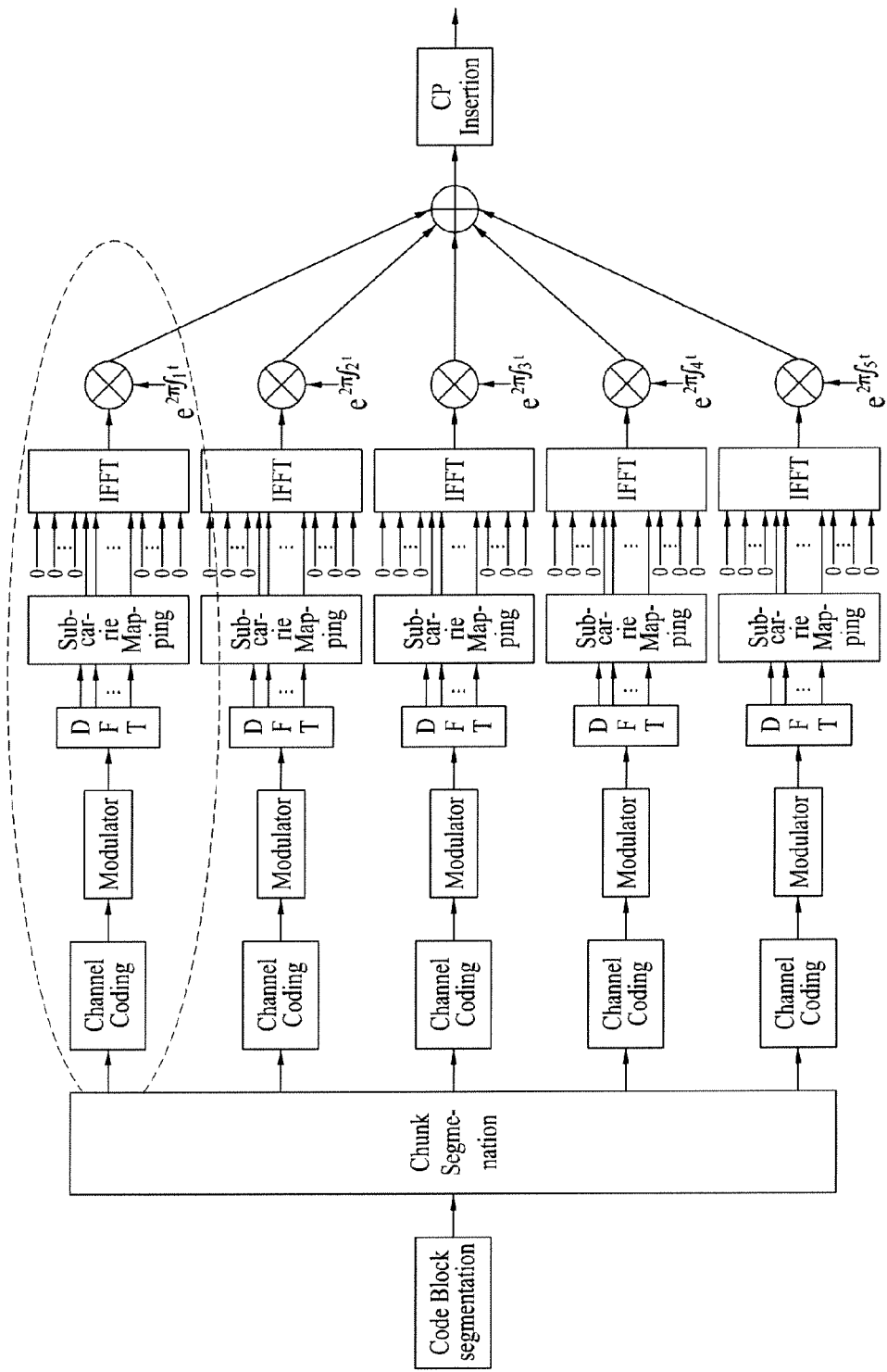
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFT-s-OFDMA. For convenience of description and better understanding of the present invention, the segmented SC-FDMA, NxSC-FDMA and NxDFT-s-OFDMA may be generically referred to as 'segment SC-FDMA'. Referring to FIG. 9, in order to reduce single carrier characteristics, the segment SC-FDMA groups all the time domain modulation symbols into N groups, such that a DFT process is performed in units of a group.

Figure 10:
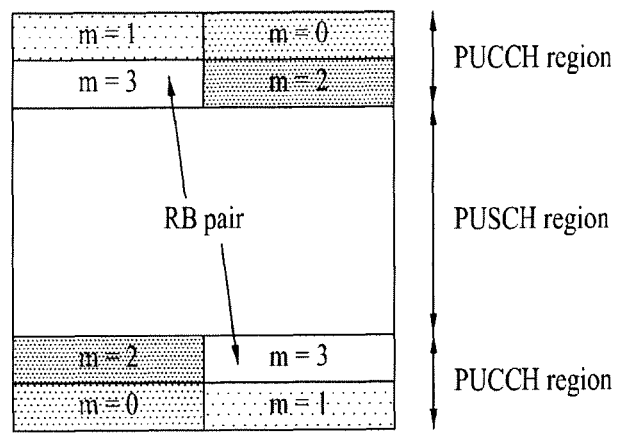
FIG. 10 shows an uplink subframe structure.

FIG. 10 shows an uplink subframe structure.

As shown in FIG. 10, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 11:
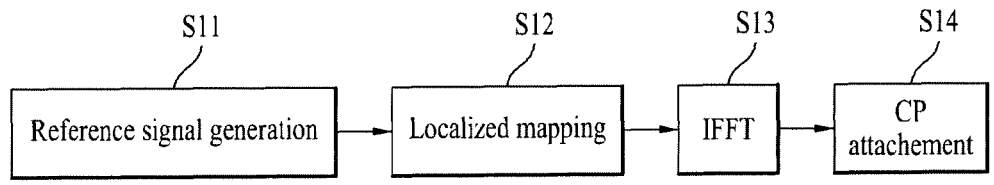
FIG. 11 is a conceptual diagram illustrating a signal processing procedure for transmitting a reference signal (RS) on uplink.

FIG. 11 illustrates a signal processing procedure for transmitting a Reference Signal (RS) in the uplink. As shown in FIG. 11, data is transformed into a frequency domain signal by a DFT precoder and the signal is then transmitted after being subjected to frequency mapping and IFFT. On the other hand, an RS does not pass through the DFT precoder. More specifically, an RS sequence is directly generated in the frequency domain (S11) and is then transmitted after being sequentially subjected to a localized-mapping process (S12), an IFFT process (S13), and a CP attachment process (S14).

The RS sequence $r_{u,v}^{(\alpha)}(n)$ is defined by a cyclic shift $\alpha$ of a base sequence and may be expressed by the following equation 1.

$$r_{u,v}^{(\alpha)}(n) = e^{j\alpha n}\bar{r}_{u,v}(n), 0 \le n < M_{sc}^{RS},$$ [Equation 1]

where $M_{sc}^{RS} = mN_{sc}^{RB}$ denotes the length of the RS sequence, $N_{sc}^{RB}$ denotes the size of a resource block represented in subcarriers, and m is $1 \le m \le N_{RB}^{max,UL}$. $N_{RB}^{max,UL}$ denotes a maximum UL transmission band.

A base sequence $\bar{r}_{u,v}(n)$ is divided into several groups. $u \in \{0, 1, \ldots, 29\}$ denotes group number, and v corresponds to a base sequence number in a corresponding group. Each group includes one base sequence v=0 having a length of $M_{sc}^{RS} = mN_{sc}^{RB}$ ($1 \le m \le 5$) and two base sequences v=0,1 having a length of $M_{sc}^{RS} = mN_{sc}^{RB}$ ($6 \le m \le N_{RB}^{max,UL}$). The sequence group number u and the number v within a corresponding group may be changed with time. The base sequence $\bar{r}_{u,v}(0), \ldots, \bar{r}_{u,v}(M_{sc}^{RS}-1)$ is defined based on a sequence length $M_{sc}^{RS}$.

The base sequence having a length of $3N_{sc}^{RB}$ or more may be defined as follows.

With respect to $M_{sc}^{RS} \ge 3N_{sc}^{RB}$ the base sequence $\bar{r}_{u,v}(0), \ldots, \bar{r}_{u,v}(M_{sc}^{RS}-1)$ is given by the following equation 2.

$$\bar{r}_{u,v}(n) = x_q(n \bmod N_{ZC}^{RS}), 0 \le n < M_{sc}^{RS},$$ [Equation 2]

where a q-th root Zadoff-Chu sequence may be defined by the following equation 3.

$$x_q(m) = e^{-j\frac{\pi q m(m+1)}{N_{ZC}^{RS}}}, 0 \le m \le N_{ZC}^{RS} - 1,$$ [Equation 3]

where q satisfies the following equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31,$$ [Equation 4]

where the length $N_{ZC}^{RS}$ of the Zadoff-Chue sequence is given by the largest prime number, thus satisfying $N_{ZC}^{RS} < M_{sc}^{RS}$.

A base sequence having a length of less than $3N_{sc}^{RB}$ may be defined as follows. First, for $M_{sc}^{RS} = N_{sc}^{RB}$ and $M_{sc}^{RS} = 2N_{sc}^{RB}$, the base sequence is given as shown in Equation 5.

$$\bar{r}_{u,v}(n) = e^{j\phi(n)\pi/4}, 0 \le n \le M_{sc}^{RS} - 1,$$ [Equation 5]

where values $\phi(n)$ for $M_{sc}^{RS} = N_{sc}^{RB}$ and $M_{sc}^{RS} = 2N_{sc}^{RB}$ are given by the following Table 1, respectively.

TABLE 1

| u | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 3 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | 1 | -1 | -3 | |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | 1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | 3 | 1 | -3 | 1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | 3 | 1 | -3 | -3 | -1 | 3 | -3 | -1 | -3 | -1 | -3 | -1 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

RS hopping is described below.

The sequence group number u in a slot $n_s$ may be defined as shown in the following equation 6 by a group hopping pattern $f_{gh}(n_s)$ and a sequence shift pattern $f_{ss}$.

$$u = (f_{gh}(n_s) + f_{ss}) \bmod 30 \quad \text{[Equation 6]}$$

where mod denotes a modulo operation.

17 different hopping patterns and 30 different sequence shift patterns are present. Sequence group hopping may be enabled or disabled by a parameter for activating group hopping provided by a higher layer.

Although the PUCCH and the PUSCH have the same hopping pattern, the PUCCH and the PUSCH may have different sequence shift patterns.

The group hopping pattern $f_{gh}(n_s)$ is the same for the PUSCH and the PUCCH and is given by the following equation 7.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled,} \end{cases} \quad \text{[Equation 7]}$$

where c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The definition of the sequence shift pattern $f_{ss}$ varies between the PUCCH and the PUSCH.

The sequence shift pattern $f_{ss}^{PUCCH}$ of the PUCCH is $f_{ss}^{PUCCH} = N_{ID}^{cell} \bmod 30$ and the sequence shift pattern of $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

The following is a description of sequence hopping.

Sequence hopping is applied only to an RS having a length of $M_{sc}^{RS} \geq 6N_{sc}^{RB}$.

For an RS having a length of $M_{sc}^{RS} < 6N_{sc}^{RB}$, a base sequence number v within a base sequence group is v=0.

For an RS having a length of $M_{sc}^{RS} \geq 6N_{sc}^{RB}$, a base sequence number v within a base sequence group in a slot $n_s$ is given by the following equation 8.

$$v = \begin{cases} c(n_s) & \text{if group hopping is disabled and sequence hopping is enabled} \\ 0 & \text{otherwise} \end{cases} \quad \text{[Equation 8]}$$

where c(i) denotes a pseudo-random sequence and a parameter for enabling sequence hopping provided by a higher layer determines whether or not sequence hopping is possible. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined in the following manner.

The RS sequence $r^{PUSCH}(.)$ for the PUCCH is defined as $r^{PUSCH}(m \cdot M_{sc}^{RS}+n)=r_{u,v}^{(\alpha)}(n)$. Here, m and n satisfy $$m = 0, 1$$
$$n = 0, \ldots, M_{sc}^{RS} - 1$$

and satisfy $M_{sc}^{RS}=M_{sc}^{PUSCH}$.

A cyclic shift in one slot is given by a $\alpha=2^{n_{cs}}/12$ together with $n_{cs}=(n_{DMRS}^{(1)}+n_{DMRS}^{(2)}+n_{PRS}(n_s))$ mod 12.

Here, $n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is given by $n_{PRS}(n_s)=\Sigma_{i=0}^{7}c(8 \cdot n_s)+i) \cdot 2^i$.

c(i) is a pseudo-random sequence and c(i) is also a cell-specific value. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\epsilon_{PUSCH}$ and is mapped to the same physical resource block (PRB) set used for the corresponding PUSCH within the sequence that starts at $r^{PUSCH}(0)$. When the sequence is mapped to a resource element (k,l) (l=3 for a normal CP and l=2 for an extended CP) within a subframe the order of k is first increased and the slot number is then increased.

In summary, a ZC sequence is used along with cyclic extension if the length is greater than or equal to $3N_{sc}^{RB}$ and a computer-generated sequence is used if the length is less than $3N_{sc}^{RB}$. The cyclic shift is determined according to a cell-specific cyclic shift, a UE-specific cyclic shift, a hopping pattern, and the like.

Figure 12A:
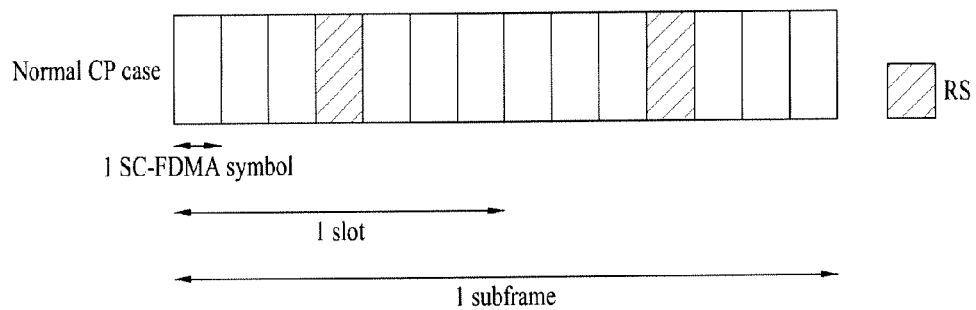
FIG. 12 shows demodulation reference signal (DMRS) structures for a physical uplink shared channel (PUSCH).
Figure 12B:
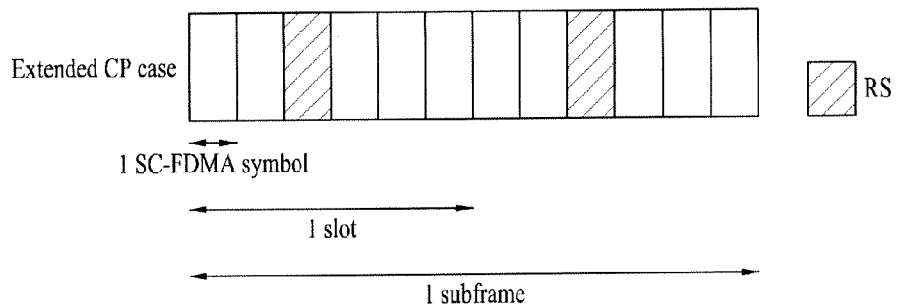

FIG. 12A illustrates the structure of a demodulation reference signal (DMRS) for a PUSCH in the case of normal CP and FIG. 12B illustrates the structure of a DMRS for a PUSCH in the case of extended CP. In the structure of FIG. 12A, a DMRS is transmitted through fourth and eleventh SC-FDMA symbols and, in the structure of FIG. 12B, a DMRS is transmitted through third and ninth SC-FDMA symbols.

FIGS. 13 to 16 illustrate a slot level structure of a PUCCH format. The PUCCH includes the following formats in order to transmit control information.

(1) Format 1: Used for on-off keying (OOK) modulation and scheduling request (SR)

(2) Format 1a and Format 1b: Used for ACK/NACK transmission

1) Format 1a: BPSK ACK/NACK for one codeword

2) Format 1b: QPSK ACK/NACK for two codewords (3) Format 2: Used for QPSK modulation and CQI transmission (4) Format 2a and Format 2b: Used for CQI and ACK/NACK simultaneous transmission.

Table 4 shows a modulation scheme and the number of bits per subframe according to PUCCH format. Table 5 shows the number of RSs per slot according to PUCCH format. Table 6 shows SC-FDMA symbol locations of an RS according to PUCCH format. In Table 4, the PUCCH formats 2a and 2b correspond to the case of normal CP.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA symbol location of RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 13:
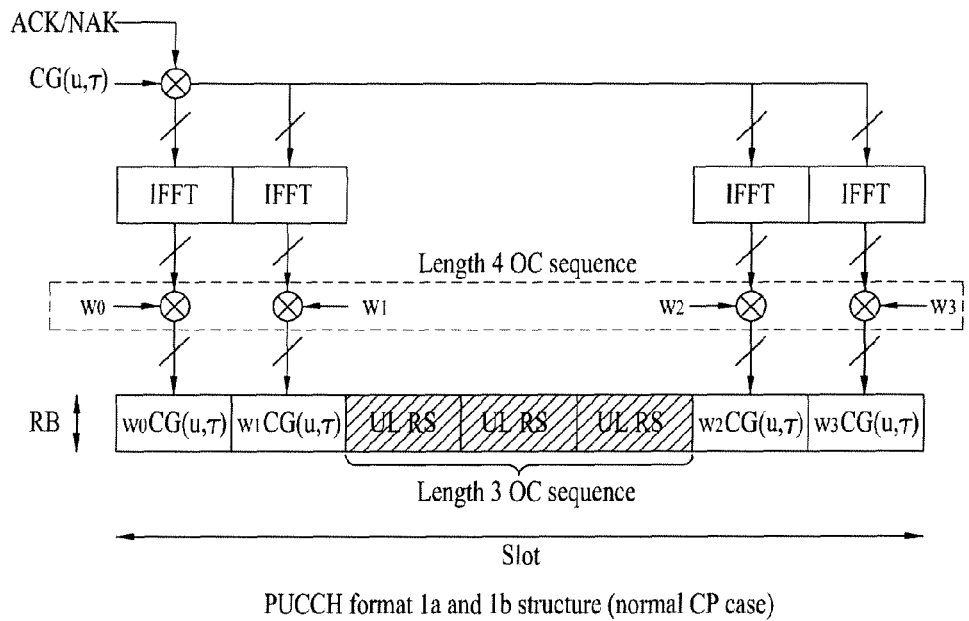
FIGS. 13 and 14 exemplarily show slot level structures of PUCCH formats 1a and 1b.
Figure 14:
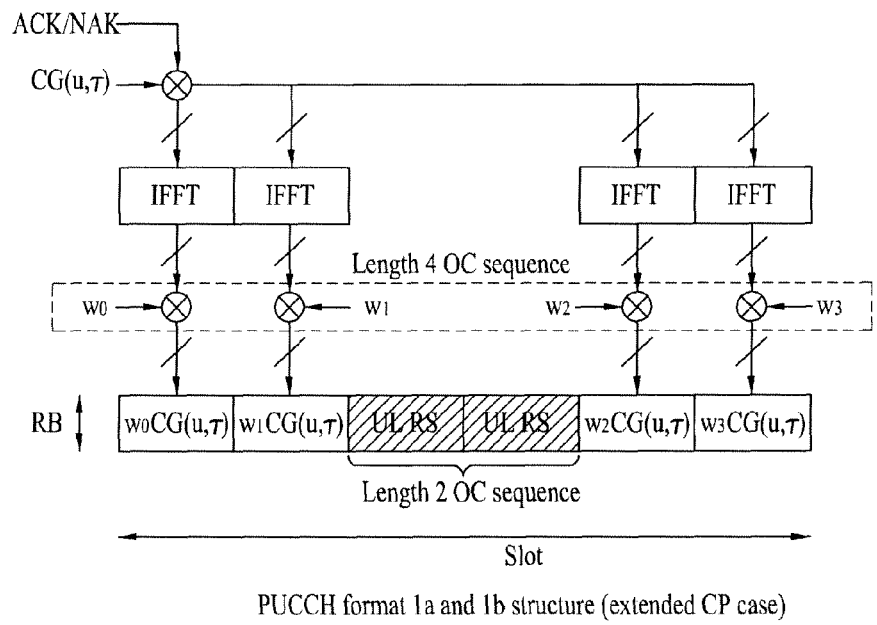

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Figure 15:
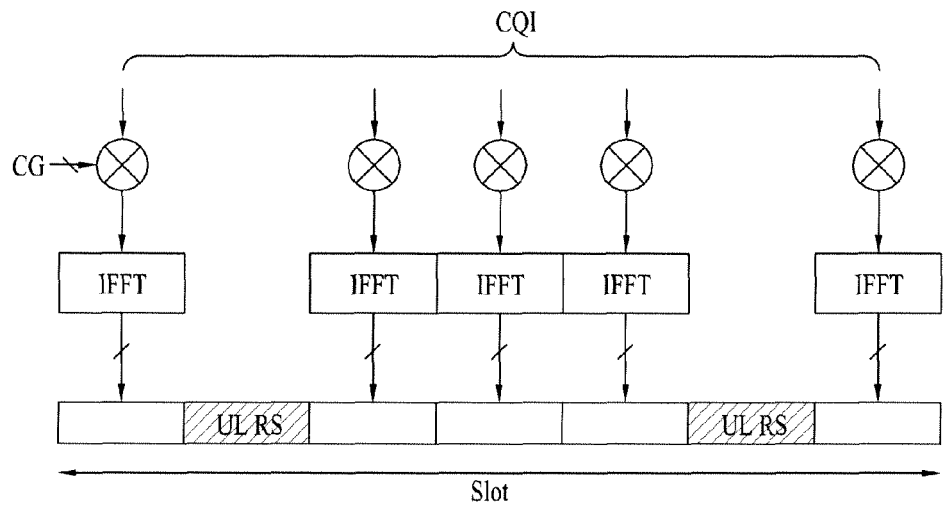
FIGS. 15 and 16 exemplarily show slot level structures of PUCCH formats 2/2a/2b.
Figure 16:
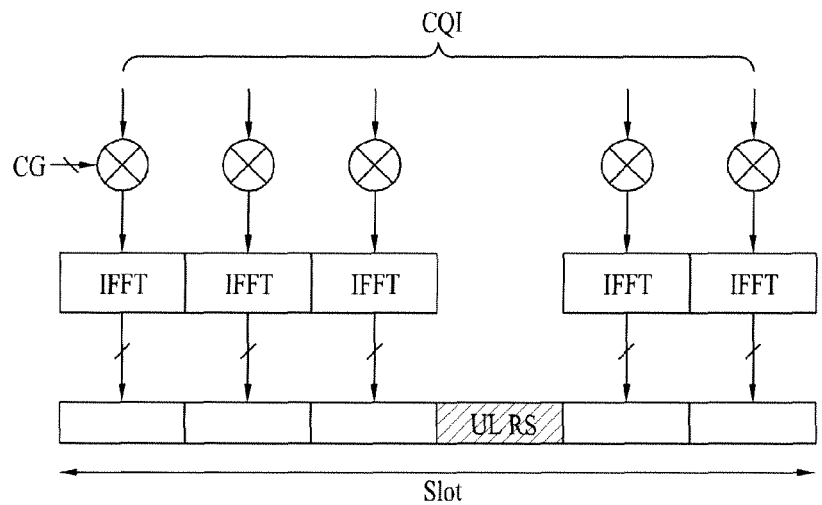

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same FEB. For example, in PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1b are shown in the following Tables 7 and 8.

TABLE 7

Length-4 orthogonal sequences for PUCCH formats 1/1a/1b

| Sequence index $n_{oc}$ ($n_s$) | Orthogonal sequences $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}$ ($n_s$) | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The orthogonal sequences (OCs) for the RS in the PUCCH formats 1/1a/1b are shown in Table 9.

TABLE 9

| | 1a and 1b | |
| --- | --- | --- |
| Sequence index $\bar{n}_{oc}$ ($n_s$) | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b when $\Delta_{shift}^{PUCCH}=2$.

Figure 18:
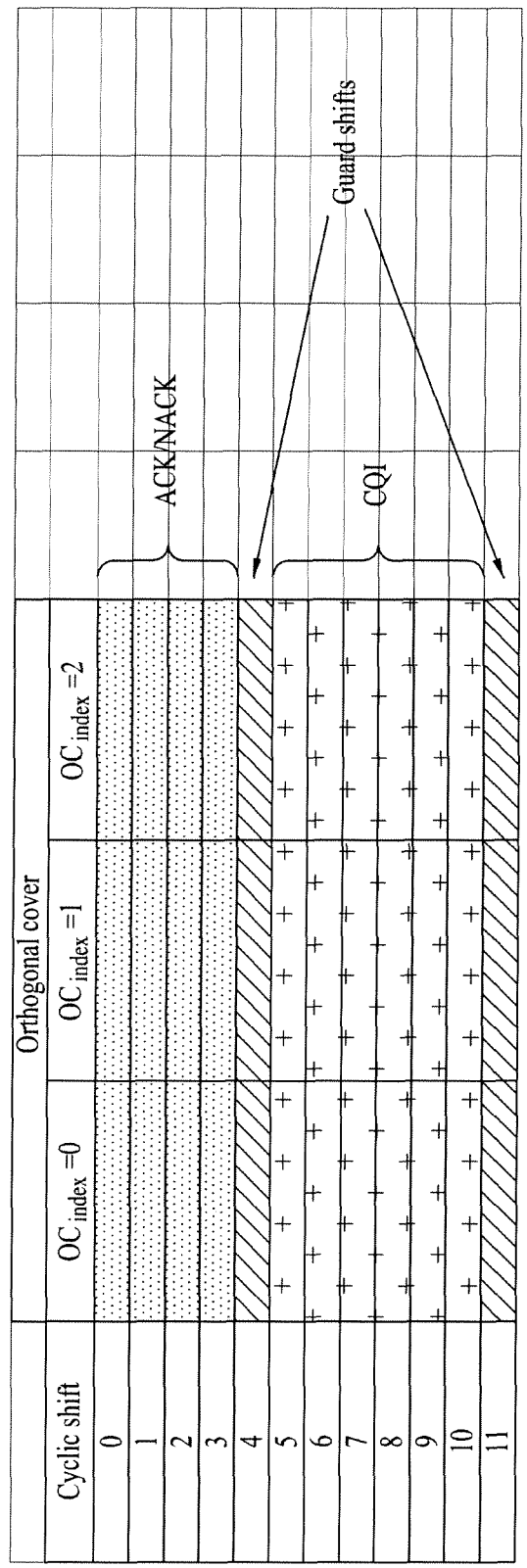
FIG. 18 is a diagram showing channelization of a structure in which PUCCH formats 1/1a/1b and PUCCH formats 2/2a/2b are mixed within the same PRB.

FIG. 18 illustrates channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping 1) For inter-cell interference randomization 2) Slot-based access for mapping between ACK/NACK channels and resources (k)

A resource $n_r$ for PUCCH formats 1/1a/1b includes the following combination.

(1) CS (=DFT OC in a symbol level) ($n_{cs}$)

(2) OC (OC in a slot level) ($n_{oc}$)

(3) Frequency RB ($n_{rb}$)

When indices representing the CS, the OC and the RB are $n_{cs}$, $n_{oc}$ and $n_{rb}$, respectively, a representative index $n_r$ includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a/2b. Here, Reed Muller (RM) channel coding may be applied.

For example, in the LTE system, channel coding for a UL CQI is described as follows. A bit stream $a_0, a_1, a_2, a_3, \ldots, a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the coded bits. Before QPSK modulation, the coded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2, \qquad \text{[Equation 9]}$$

where $i = 0, 1, 2, \ldots, B-1$.

Table 11 shows an uplink control information (UCI) field for broadband reporting (single antenna port, transmit diversity or open loop spatial multiplexing PDSCH) CQI feedback.

TABLE 11

| Field | Bandwidth |
|---|---|
| Wideband CQI | 4 5 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband reporting.

TABLE 13

| | Bit widths | | |
|---|---|---|---|
| | | 4 antenna ports | |
| Field | 2 antenna ports | Up to two layers | Up to four layers |
| RI (Rank Indication) | 1 | 1 | 2 |

Figure 19:
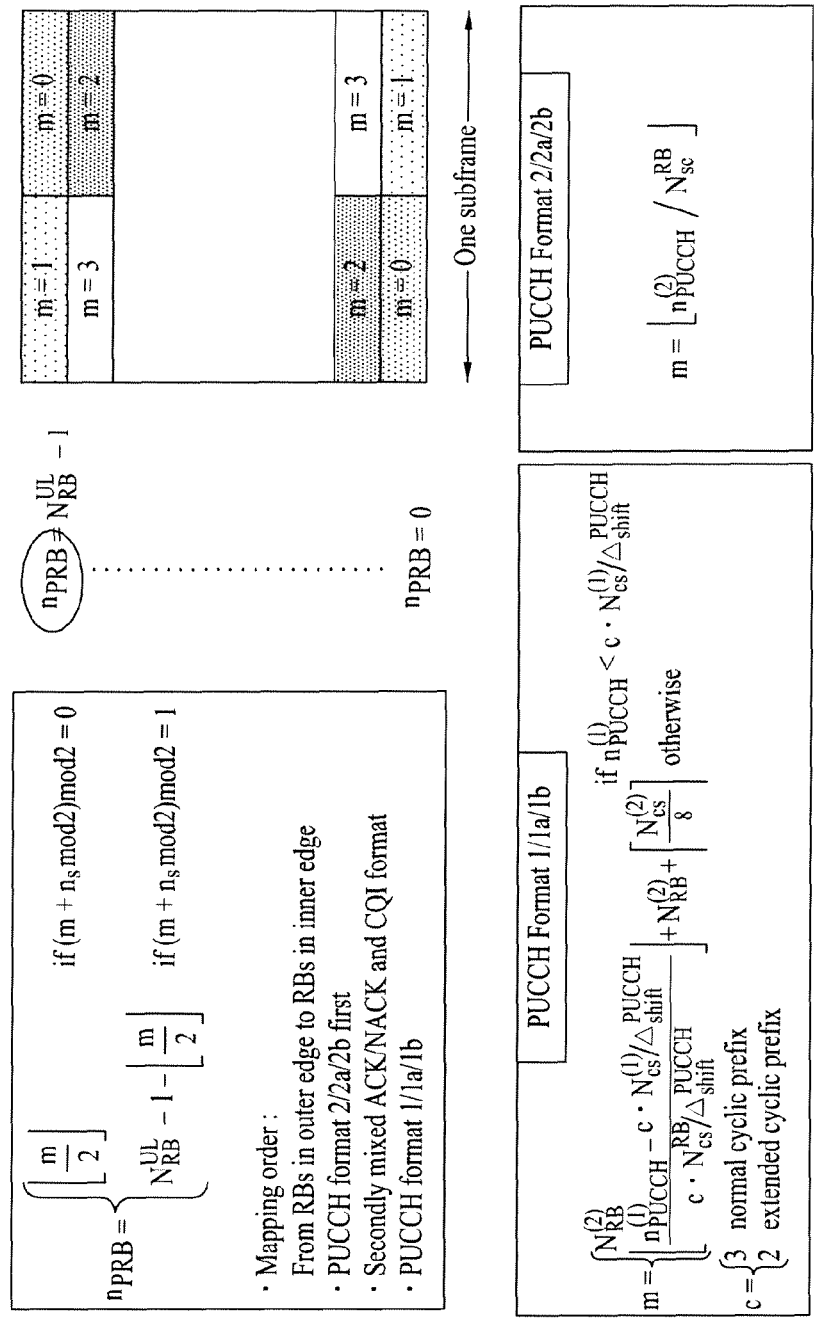
FIG. 19 is a diagram showing allocation of a physical resource allocation (PRB) used to transmit a PUCCH.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "multi-carrier" may be used interchangeably with the terms "carrier aggregation" and "bandwidth aggregation". The term "carrier aggregation" may refer to both contiguous carrier aggregation and non-contiguous carrier aggregation.

Figure 20:
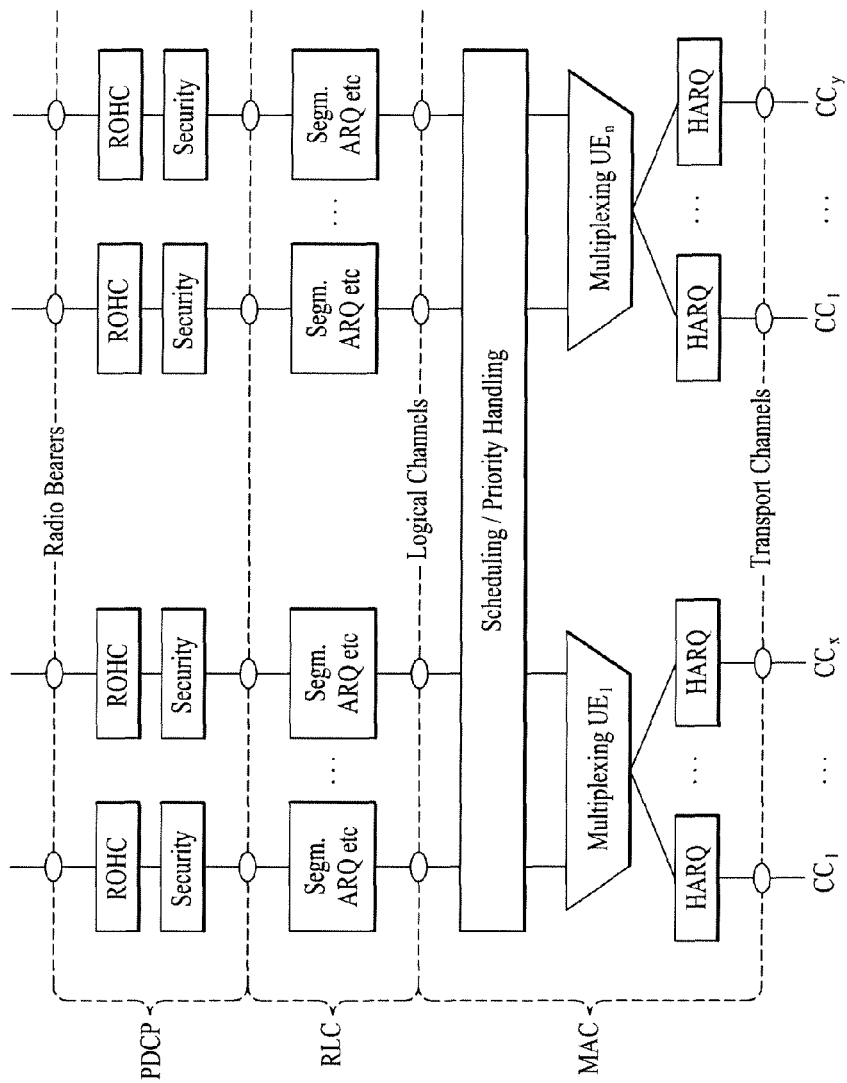
FIG. 20 is a conceptual diagram of management of a downlink component carrier (DL CC) in a base station (BS).
Figure 21:
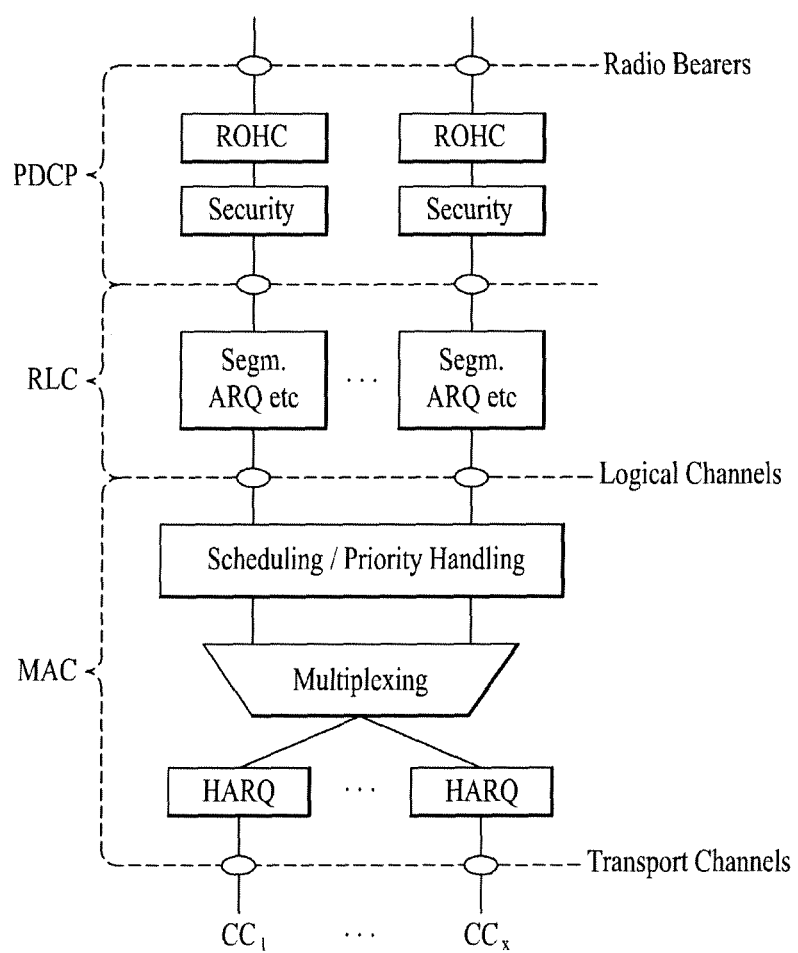
FIG. 21 is a conceptual diagram of management of an uplink component carrier (UL CC) in a user equipment (UE).

FIG. 20 is a conceptual diagram illustrating management of downlink component carriers (DL CCs) in a base station (BS) and FIG. 21 is a conceptual diagram illustrating management of uplink component carriers (UL CCs) in a user equipment (UE). For ease of explanation, the higher layer is simply described as a MAC (or a MAC entity) in the following description of FIGS. 20 and 21.

Figure 22:
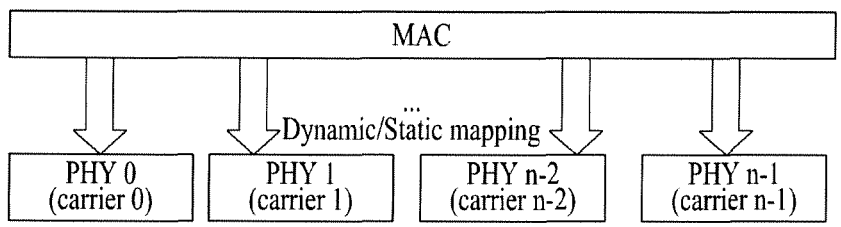
FIG. 22 is a conceptual diagram of the case where one MAC layer manages multiple carriers in a BS.
Figure 23:
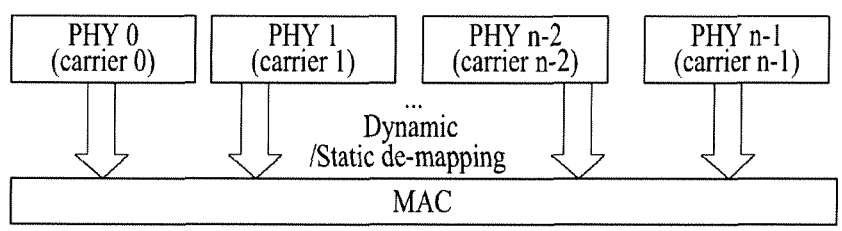
FIG. 23 is a conceptual diagram of the case where one MAC layer manages multiple carriers in a UE.

FIG. 22 is a conceptual diagram illustrating management of multiple carriers by one MAC entity in a BS. FIG. 23 is a conceptual diagram illustrating management of multiple carriers by one MAC entity in a UE.

As shown in FIGS. 22 and 23, one MAC manages and operates one or more frequency carriers to perform transmission and reception. Frequency carriers managed by one MAC need not be contiguous and as such they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
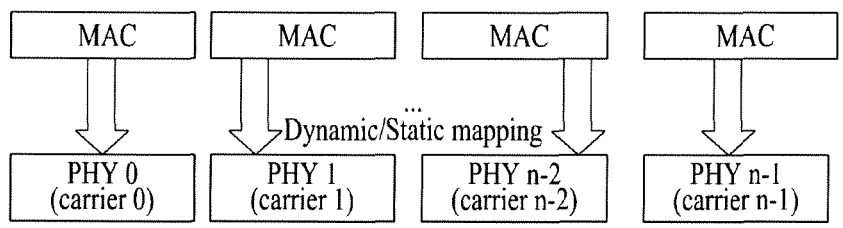
FIG. 24 is a conceptual diagram of the case where one MAC layer manages multiple carriers in a BS.
Figure 25:
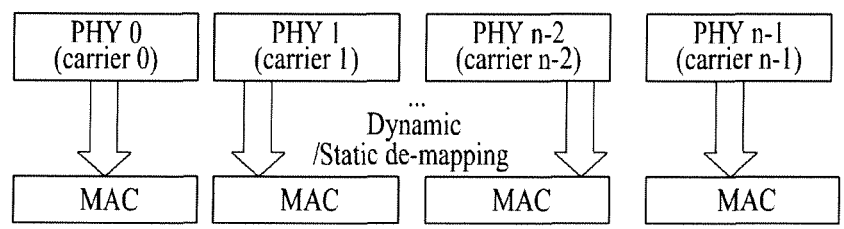
FIG. 25 is a conceptual diagram of the case where a plurality of MAC layers manages multiple carriers in a UE.
Figure 26:
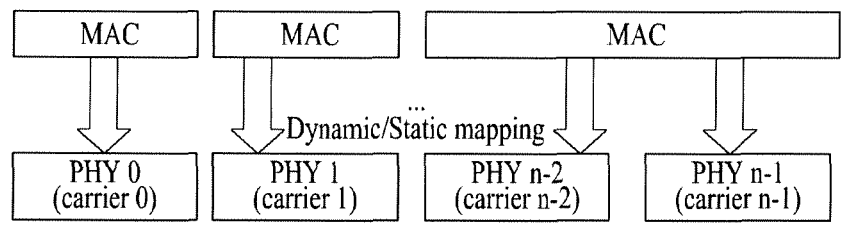
FIG. 26 is a conceptual diagram of the case where a plurality of MAC layers manages multiple carriers in a BS according to one embodiment of the present invention.
Figure 27:
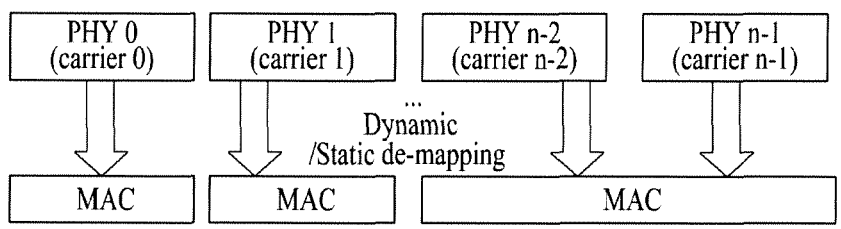
FIG. 27 is a conceptual diagram of the case where a plurality of MAC layers manages multiple carriers from the viewpoint of UE reception according to another embodiment of the present invention.

FIG. 24 is a conceptual diagram illustrating management of multiple carriers by a plurality of MAC entities in a BS. FIG. 25 is a conceptual diagram illustrating management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Hereinafter, it is assumed for ease of explanation description that, when a PDCCH is transmitted through DL component carrier #0, a PDSCH corresponding to the PDCCH is transmitted through DL component carrier #0. However, it is apparent that cross-carrier scheduling may be applied such that the PDSCH is transmitted through a different DL component carrier. The term "component carrier" may be replaced with other equivalent terms (e.g., cell).

Figure 28:
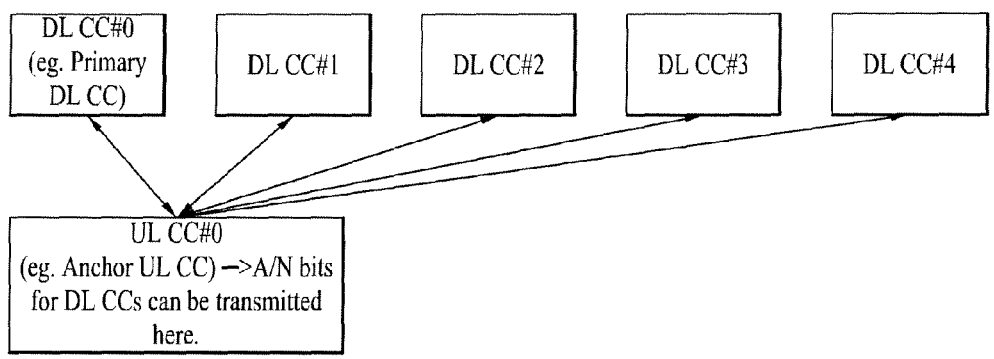
FIG. 28 is a diagram showing asymmetric carrier aggregation (CA) in which a plurality of downlink component carriers (DL CCs) and one uplink CC are linked.

FIG. 28 shows a scenario in which uplink control information (UCI) is transmitted in a radio communication system supporting carrier aggregation (CA). For ease of explanation, it is assumed in this example that the UCI is ACK/NACK (A/N). However, the UCI may include control information such as channel state information (CSI) (e.g., CQI, PMI, RI, etc.) or scheduling request information (e.g., SR, etc.).

FIG. 28 shows asymmetric carrier aggregation in which 5 DL CCs and one UL CC are linked. The illustrated asymmetric carrier aggregation may be set from the viewpoint of UCI transmission. That is, a DL CC-UL CC linkage for UCI and a DL CC-UL CC linkage for data may be set differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs. DL CC may also be referred to as DL Cell, and UL CC may also be referred to as UL Cell. In addition, the anchor DL CC may also be referred to as DL PCell, and the anchor UL CC may also be referred to as UL PCell.

A DL primary CC may be defined as a DL CC linked with a UL primary CC. Here, linkage includes implicit and explicit linkage. In LTE, one DL CC and one UL CC are uniquely paired. For example, a DL CC that is linked with a UL primary CC by LTE pairing may be referred to as a DL primary CC. This may be regarded as implicit linkage. Explicit linkage indicates that a network configures the linkage in advance and may be signaled by RRC or the like. In explicit linkage, a DL CC that is paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. The DL primary CC may also be configured through higher layer signaling. The DL primary CC may be a DL CC in which a UE performs initial access. DL CCs other than the DL primary CC may be referred to as DL secondary CCs. Similarly, UL CCs other than the UL primary CC may be referred to as UL secondary CCs.

DL-UL may correspond only to FDD. DL-UL pairing may not be defined for TDD since TDD uses the same frequency. In addition, a DL-UL linkage may be determined from a UL linkage through UL E-UTRA Absolute Radio Frequency Channel Number (EARFCN) of SIB2. For example, the DL-UL linkage may be acquired through SIB2 decoding when initial access is performed and may be acquired through RRC signaling otherwise. Accordingly, only the SIB2 linkage may be present and other DL-UL pairing may not be defined. For example, in the 5DL:1UL structure of FIG. 28, DL CC #0 and UL CC #0 may be in an SIB2 linkage relation with each other and other DL CCs may be in an SIB2 linkage relation with other UL CCs which have not been set for the UE.

While some embodiments are focused on asymmetrical carrier aggregation, the present invention can be applied to various carrier aggregation scenarios including symmetrical carrier aggregation.

EMBODIMENT

UCI Transmission Using Multi-Sequence Modulation (MSM)

Hereinafter, the present invention proposes a method for efficiently transmitting increased uplink control information with reference to the attached drawings. In more detail, the present invention proposes a new PUCCH format, a signal processing step, and a resource allocation method for transmitting increased uplink control information. For convenience of description, the PUCCH format proposed by the present invention will hereinafter be referred to as PUCCH format 3 in terms of a new PUCCH format, an LTE-A PUCCH format, or a PUCCH format 2 defined in the legacy LTE. Technique scope or spirit of the PUCCH format proposed by the present invention can be easily applied to an arbitrary physical channel (e.g., PUSCH) capable of transmitting uplink control information using the same or similar scheme. For example, the embodiment of the present invention can be applied to a periodic PUSCH structure for periodically transmitting control information or an aperiodic PUSCH structure for aperiodically transmitting control information.

The following drawings and embodiments will be focused upon an exemplary case in which a UCI/RS symbol structure of a PUCCH format 1 (normal CP) of the legacy LTE is used as a UCI/RS symbol structure of a subframe/slot level applied to a PUCCH format of the embodiment of the present invention. However, the UCI/RS symbol structure of the subframe/slot level for use in the above PUCCH format is not limited thereto will be disclosed only for illustrative purposes and the scope and spirit of the present invention are not limited thereto. In the PUCCH format of the present invention, the number of UCI/RS symbols, the location thereof, etc. can be freely modified according to a system design. For example, the PUCCH format according to the present invention can be defined using the PUCCH format 2/2a/2b structure of the legacy LTE.

The PUCCH format according to the embodiment of the present invention may be used to transmit arbitrary categorized/sized uplink control information (UCI). For example, the PUCCH format according to the embodiment of the present invention may transmit a variety of information, for example, HARQ ACK/NACK, CQI, PMI, RI, SR, etc., and this information may have an arbitrary-sized payload. For convenience of description, the present embodiment is focused upon the exemplary case in which PUCCH format transmits ACK/NACK information, and a detailed description thereof will be given later.

Figure 29:
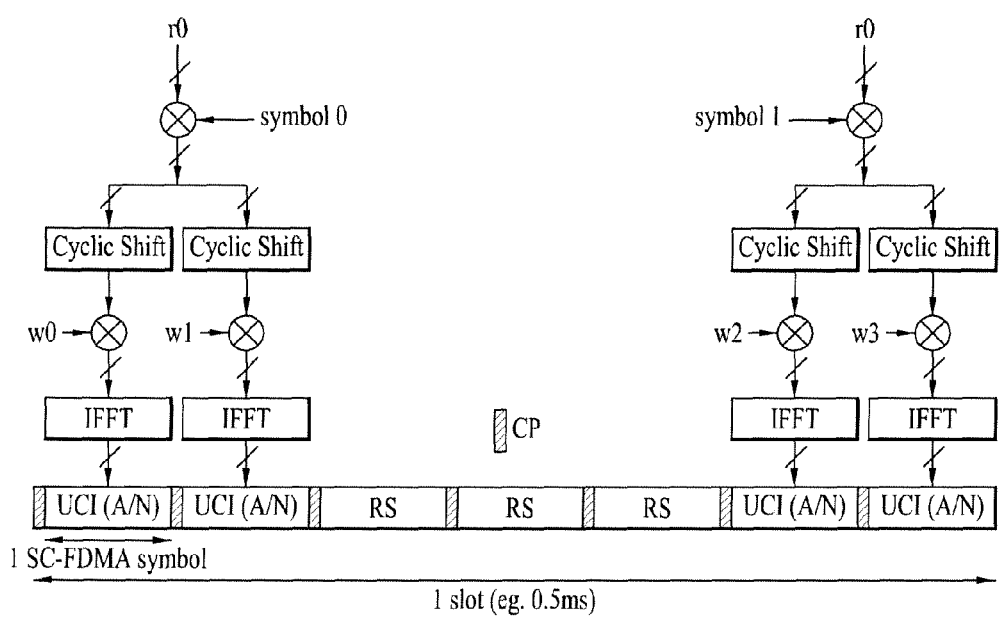
FIGS. 29 and 30 show that Spreading Factor (SF) reduction is applied to Slot 0 contained in a subframe according to one embodiment of the present invention.
Figure 30:
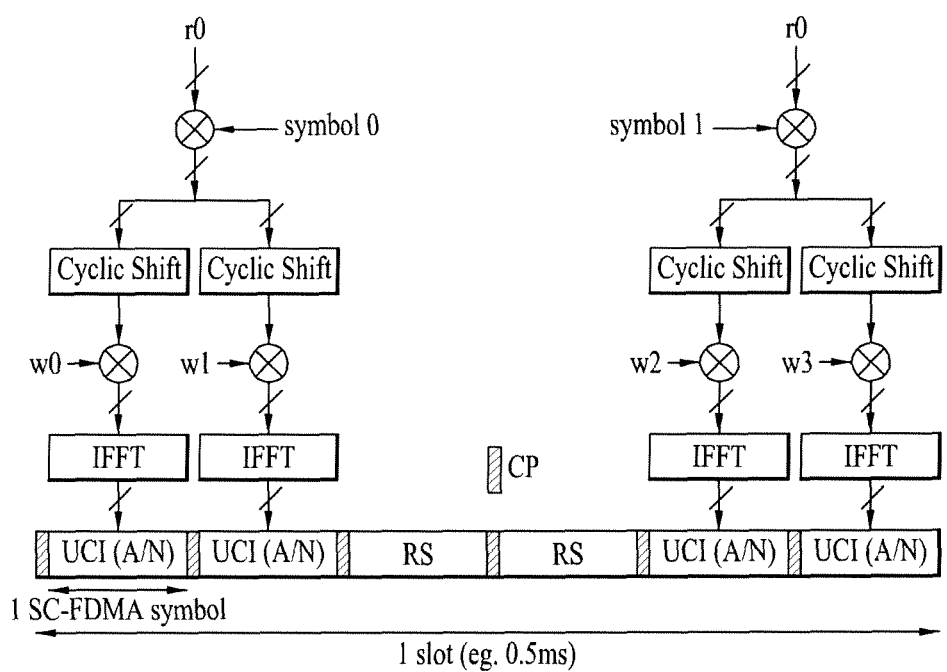

FIGS. 29 and 30 show that Spreading Factor (SF) reduction is applied to Slot 0 contained in a subframe according to one embodiment of the present invention. FIG. 29 shows the case of a normal CP, and FIG. 30 shows the case of an extended CP. In the examples shown in FIGS. 29 and 30, a spreading factor (SF) value of an OC for use in a PUCCH format of the legacy LTE is reduced from '4' to '2'. Basic signal processing steps of FIGS. 29 and 30 is identical to those of FIGS. 13 and 14.

Referring to FIGS. 29 and 30, information bits (e.g. ACK/NACK) are converted into modulated symbols (symbols 0 and 1) through modulation (e.g. QPSK, 8PSK, 16QAM, 64QAM or the like). The modulated symbols are multiplied by a base sequence r0, and a cyclic shift and an orthogonal code (OC) ([w0 w1]; [w2 w3]) with SF=2 are sequentially applied to the modulated symbols. Then, the modulated symbols to which the cyclic shift and OC have been applied are subjected to IFFT to be mapped to SC-FDMA symbols. Here, r0 includes a base sequence having a length of 12. The OC includes a Walsh cover or a DFT code defined in LTE. Orthogonal codes [w0 w1] and [w2 w3] may be independently provided or may have the same value according to implementation scheme.

The legacy LTE PUCCH format 1a/1b can transmit only one modulated symbol in one slot because it uses SF=4. Furthermore, since the same information is repeated on a slot basis, LTE PUCCH format 1a/1b can transmit only one modulated symbol at a subframe level. Accordingly, LTE PUCCH formats can transmit ACK/NACK information having a maximum of 2 bits in case of QPSK. However, the PUCCH format illustrated in FIGS. 29 and 30 can transmit two modulated symbols per slot due to SF reduction. Furthermore, if slots are configured such that they transmit different pieces of information, a maximum of 4 modulated symbols can be transmitted at the subframe level. Therefore, the illustrated PUCCH format can transmit UCI (e.g. ACK/NACK) having a maximum of 8 bits in case of QPSK.

However, SF reduction can transmit (1) a maximum of 8 bits in case of QPSK modulation; and (2) UCI having occupied four SC-FDMA symbols on a slot basis occupies two SC-FDMA symbols, so that energy per UCI is cut in half, resulting in the loss of 3 dB SNR (Signal to Noise Ratio).

A method for solving the above-mentioned problem will hereinafter be described. In more detail, allocation of N PUCCH resources is performed, modulation (e.g., QPSK, 8PSK, M-ary QAM, etc.) of each resource is performed (hereinafter referred to as Multi-Sequence Modulation (MSM)), and the modulated result is reduced to SF=2.

For convenience of description and better understanding of the present invention, an exemplary case in which N is set to 2 (N=2) and two PUCCH resources are present in the same PRB will hereinafter be described according to one embodiment of the present invention. In addition, since a CM is increased although MSM is applied to the same PRB, two orthogonal resources use the same PRB index, the same OC index, and different cyclic shifts so as to minimize the increased CM. That is, MSM can be used using only cyclic shifts, and the cyclic shift may be a contiguous value or be spaced apart from another cyclic shift by $\Delta_{shift}^{PUCCH}$.

Figure 31:
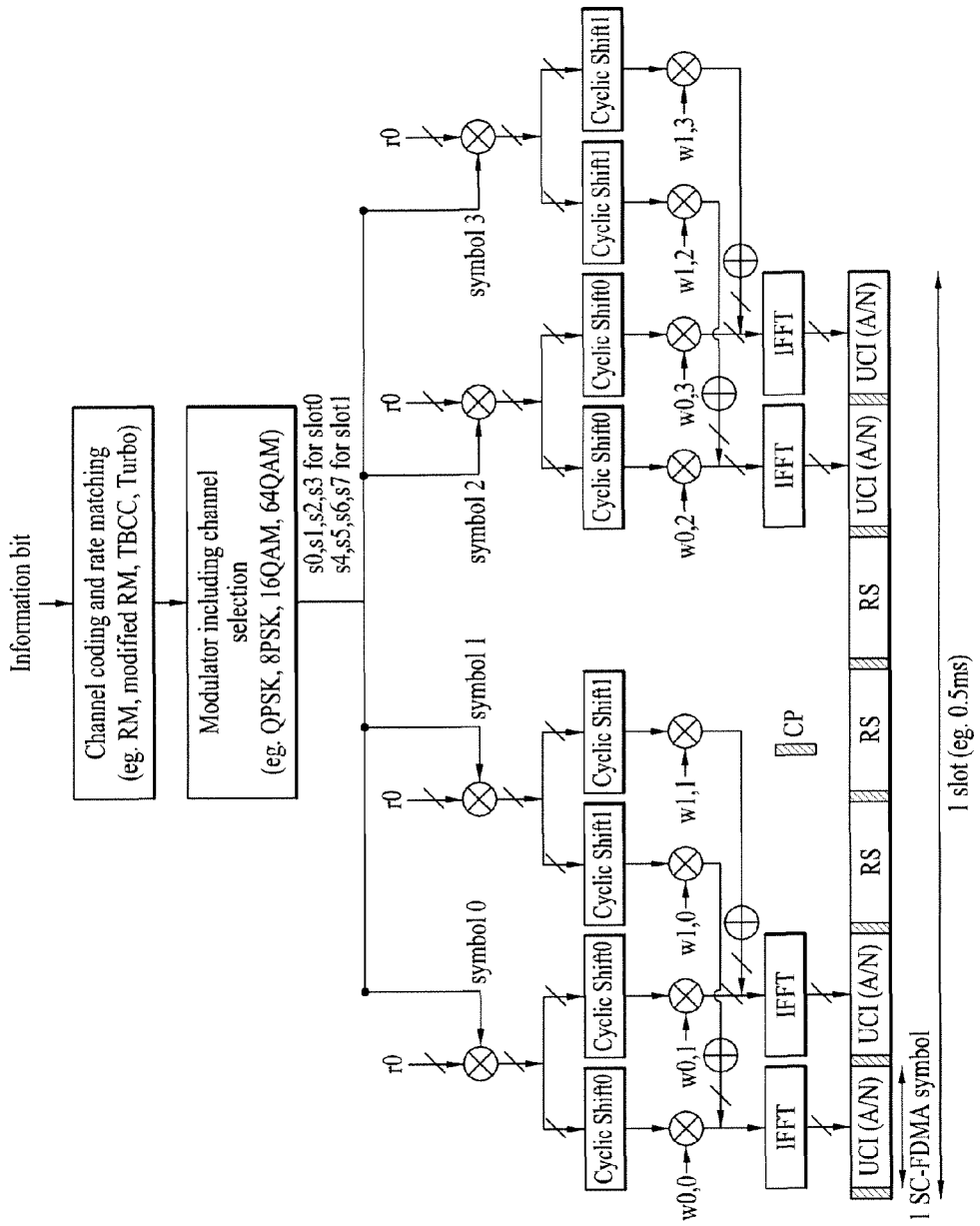
FIG. 31 shows a PUCCH format to which channel selection and SF reduction are applied, and signal processing for the PUCCH format according to one embodiment of the present invention.

FIG. 31 shows a PUCCH format to which channel selection and SF reduction are applied, and signal processing for the PUCCH format according to one embodiment of the present invention. The channel coding block shown in FIG. 31 is disclosed only for illustrative purposes, and will herein be omitted for convenience of description. Basic signal processing except for channel selection is identical to those of FIGS. 29 and 30. In FIG. 31, the same-numbered cyclic shift (i.e., cyclic shift M (e.g., M=0, or M=1)) indicates a CS derived from the same orthogonal resource, and it should be noted that the same-numbered cyclic shifts do not have the same value. For example, if SC-FDMA or CS hopping at a lot level is applied, the cyclic shift M may have a different value according to an SC-FDMA symbol or a slot. In the orthogonal codes (wa,b) (for example, [w0,1; w1,1],[w2,1; w3,1] or [w0, 1; w1,1; w2,1; w3,1]), a is an element index contained in an orthogonal code, and b is an orthogonal code index.

Referring to FIG. 31, channel coding is first applied to UCI (e.g., ACK/NACK). For example, channel coding includes joint coding related to multiple ACK/NACK signals for data received from a plurality of DL CCs, so that a single coding bit sequence (or codeword) can be obtained. For example, the channel coding scheme may include RM-based coding, TBCC, or turbo coding. Thereafter, a coded bit (also called a coding bit) is rate-matched. The rate-matching scheme includes a cyclic buffer rate matching. In addition, rate matching includes puncturing by which only a desired coded bit size remains from the codeword. For example, it is assumed that RM coding (20,A) is used in LTE PUCCH. In case of using QPSK modulation in this example, 16 coded bits are needed. In this case, after a coded bit having a length of 20 is generated from LTE RM (20,A), the latter four bits can be punctured. If a certain RM supports the size of (14,A), the coded bit sequence having a length of 14 is generated, and cyclic buffer matching can be carried out to obtain a length of 16 ([a0, a1, . . . , a15, a0, a1]=>Length of 16). Provided that 8PSK modulation is used, a total of 24 coded bits are needed. In this case, after information bits have been coded into 20 bits using LTE RM (20,A), cyclic buffer rate matching based on 24 bits can be carried out.

After completion of channel coding, the coded bits are modulated in a manner that the coded bits can be mapped to a physical channel. In this example, the modulator generates a total of 8 modulation symbols using QPSK or 8PSK modulation.

In this case, two orthogonal resources are selected. It is assumed that each orthogonal resource is composed of OS0= (CS0,OC0), OS1=(CS1,OC1) and is present in the same PRE.

In more detail, in case of using MSM, UCI can be transmitted as follows.

Modulation symbol 0 is transmitted through SC-FDMA symbols 0~1 of Slot 0 through OS0.

Modulation symbol 1 is transmitted through SC-PUMA symbols 0~1 of Slot 0 through OS1.

Modulation symbol 2 is transmitted through SC-PUMA symbols 5~6 of Slot 0 through OS0.

Modulation symbol 3 is transmitted through SC-PUMA symbols 5~6 of Slot 0 through OS1.

Modulation symbol 4 is transmitted through SC-FDMA symbols 0~1 of Slot 1 through OS0.

Modulation symbol 5 is transmitted through SC-FDMA symbols 0~1 of Slot 1 through OS1.

Modulation symbol 6 is transmitted through SC-PUMA symbols 5~6 of Slot 1 through OS0.

Modulation symbol 7 is transmitted through SC-FDMA symbols 5~6 of Slot 1 through OS0.

Cyclic shift may be cell-specifically hopped in units of an SC-FDMA symbol. OC may define the hopping pattern either in units of a modulation symbol or in units of a slot.

Through the above-mentioned transmission method, signal carrier characteristics can be satisfied without increasing CM as compared to LTE.

A Multiple Input Multiple Output (MIMO) transmission (also called multi-antenna transmission) method according to the present invention may indicate a physical antenna, a logical antenna or a layer. The MIMO transmission method to be described later can be adapted to single-antenna port mode according to either channel condition or network scheduling. In this case, the single-antenna port mode may include not only a method for physically transmitting data or information to one antenna, but also a variety of methods for performing decoding as if the receiver has received signals from one transmission antenna through virtualization (such as Cyclic Delay Diversity (CDD), Precoding Vector Switching (PVS), or Time Switched Transmit Diversity (TSTD)).

A first method relates to a transmission diversity method in which the Alamouti code is applied to an orthogonal resource domain and an antenna domain. For convenience of description and better understanding of the present invention, it is assumed that the number of Tx antennas is set to 2. Two of RS orthogonal resources may be used to perform channel estimation for each antenna. In other words, in order to perform channel estimation per antenna, a first orthogonal resource of an RS symbol can be transmitted to a first antenna and a second orthogonal resource of the RS symbol can be transmitted to a second antenna. In addition, although the present invention has disclosed only Slot 0 for convenience of description, it should be noted that the present invention can also be applied to Slot 1.

Figure 32:
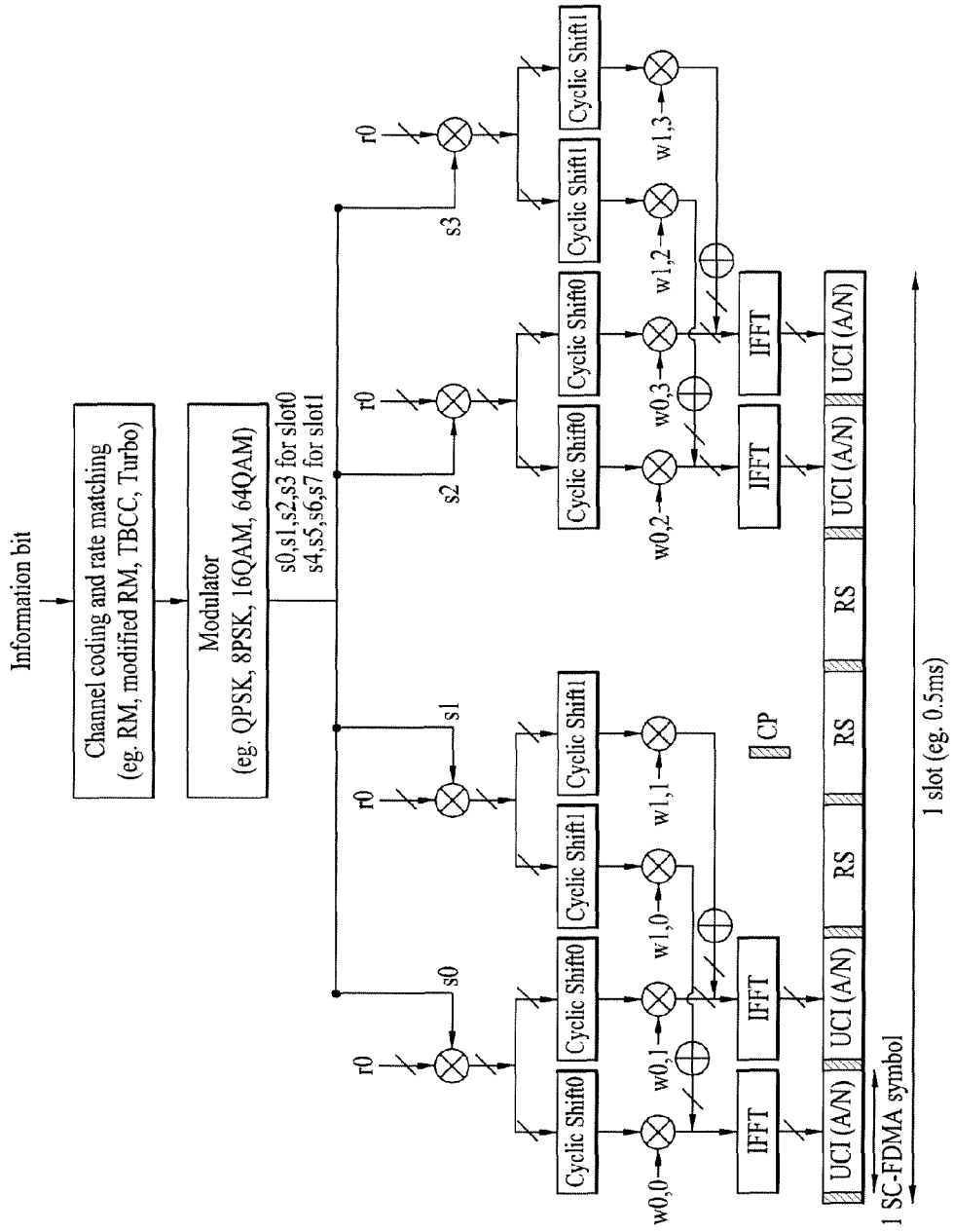
FIGS. 32 and 33 exemplarily show transmission diversity method according to one embodiment of the present invention.
Figure 33:
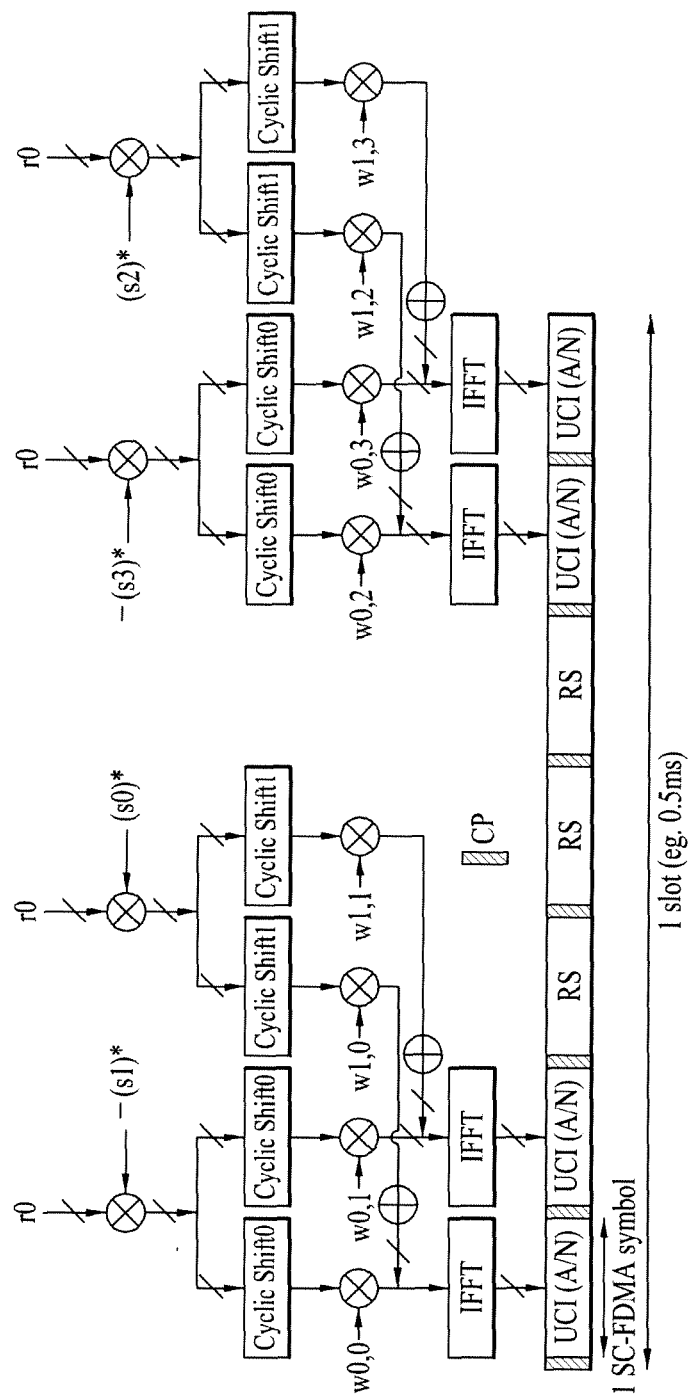

FIG. 32 shows a method for transmitting control information to Antenna 0 using a first scheme, and FIG. 32 shows a method for transmitting control information to Antenna 1 using the first scheme. Referring to FIGS. 32 and 33, a modulation symbol transmitted through Antenna 0 can be transmitted in the same manner as in 1Tx transmission. On the other hand, precoding (e.g., Alamouti coding) for transmit diversity for use in an orthogonal resource domain (e.g., cyclic shift domain, or a code domain having an orthogonal code domain) is applied to the modulation symbol transmitted through Antenna 1. The space-code domain precoding according to the present invention may be referred to as Space Code Block Coding (SCBC). In this case, the Alamouti coding may include not only a matrix shown in Equation 11 but also all unitary conversion formats for the matrix.

$$\text{Orthogonal resource domain} \downarrow \begin{pmatrix} S_0 & -(S_1)^* \\ S_1 & (S_0)^* \end{pmatrix} \xrightarrow{\text{antenna}} \quad [\text{Equation 11}]$$

In Equation 11, $(.)^*$ is denoted by a complex conjugate operation of $(.)$.

For example, the following transmission can be achieved at Slot 0 of each antenna.

Antenna 0
Through OS0, a modulation symbol (s0) is transmitted through SC-FDMA symbols 0~1 of Slot 0.
Through OS1, a modulation symbol (s1) is transmitted through SC-FDMA symbols 0~1 of Slot 0.
Through OS0, a modulation symbol (s2) is transmitted through SC-FDMA symbols 5~6 of Slot 0.
Through OS1, a modulation symbol (s3) is transmitted through SC-FDMA symbols 5~6 of Slot 0.
Antenna 1
Through OS0, a modulation symbol $-(s1)^*$ is transmitted through SC-FDMA symbols 0~1 of Slot 0.
Through OS1, a modulation symbol $(s0)^*$ is transmitted through SC-FDMA symbols 0~1 of Slot 0.
Through OS0, a modulation symbol $-(s3)^*$ is transmitted through SC-FDMA symbols 5~6 of Slot 0.
Through OS1, a modulation symbol $(s2)^*$ is transmitted through SC-FDMA symbols 5~6 of Slot 0.

In FIGS. 32 and 33, although multiple orthogonal resources allocated to the first antenna are different from multiple orthogonal resources allocated to the second antenna for convenience of description and index assignment reasons, the scope or spirit of the present invention is not limited thereto, and can also be applied to other examples as necessary. Multiple orthogonal resources allocated to the first antenna are actually identical to multiple orthogonal resources allocated to the second antenna.

A method for applying precoding (e.g., Alamouti code) for transmit diversity to a time (i.e., SC-FDMA symbol) domain and an antenna domain according to the second scheme will hereinafter be described in detail. For convenience of description, it is assumed that the number of Tx antennas is set to 2. Two RS orthogonal resources can be used for channel estimation for each antenna. In other words, in order to perform channel estimation per antenna, a first orthogonal resource can be transmitted to a first antenna, and a second orthogonal resource of the RS symbol can be applied to a second antenna. In addition, although Slot 0 is disclosed only for illustrative purposes, it is apparent that the present invention can also be applied to Slot 0 as necessary.

Figure 34:
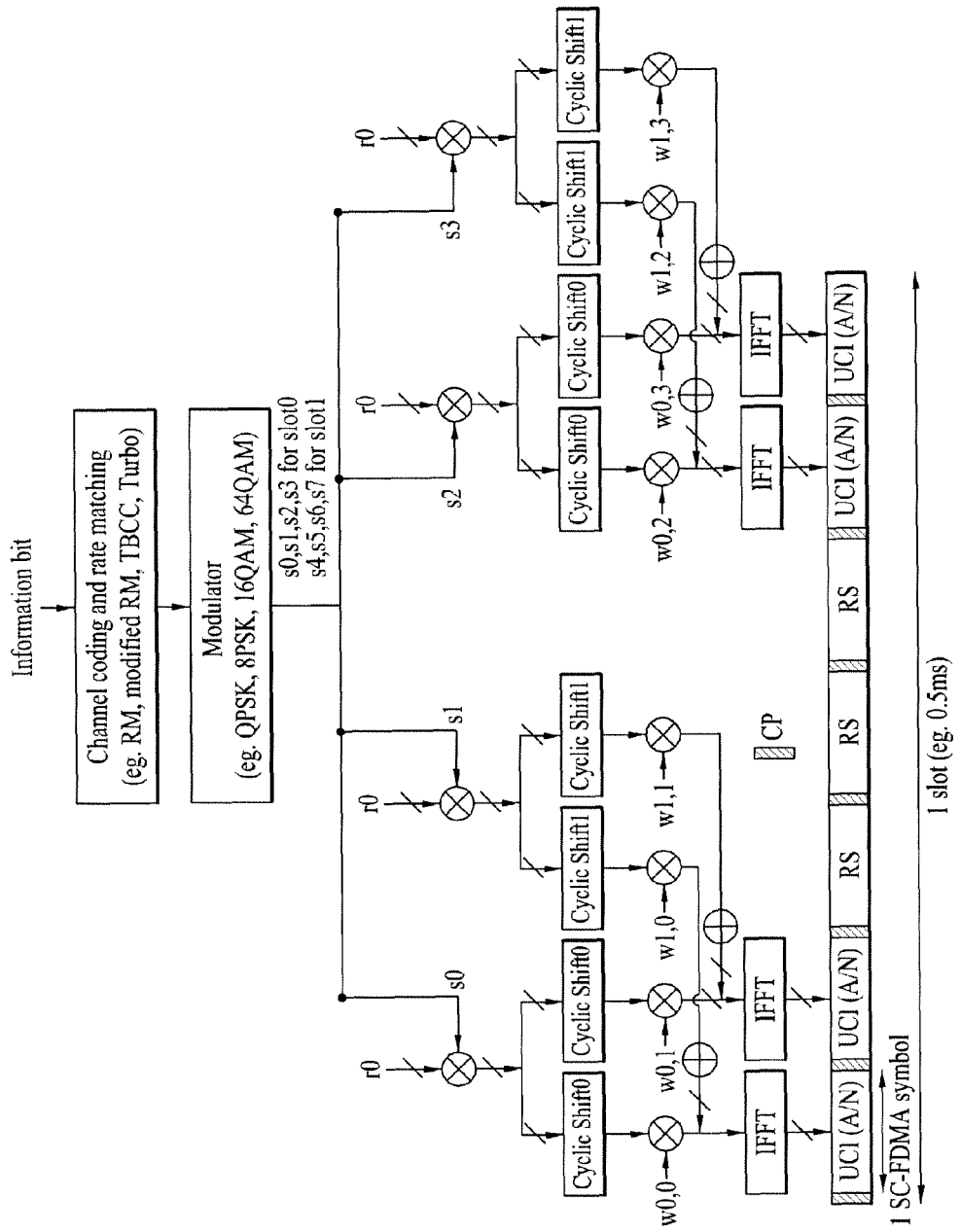
FIGS. 34 and 35 exemplarily show a transmission diversity method according to another embodiment of the present invention.
Figure 35:
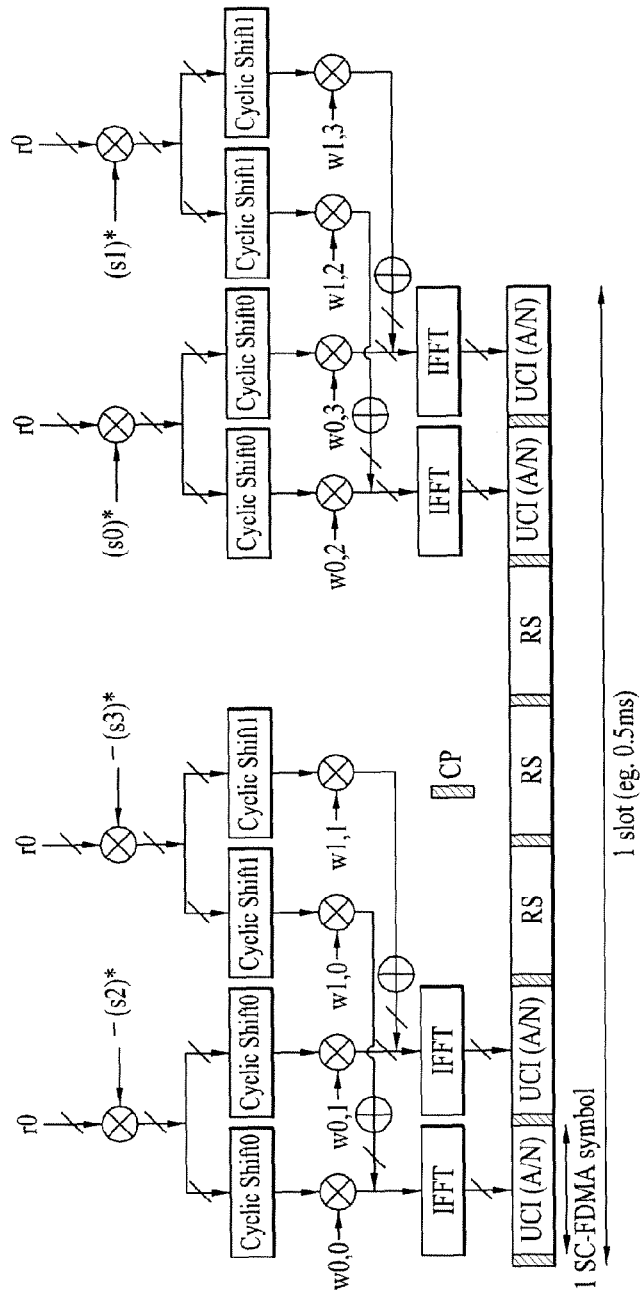

FIG. 34 shows a method for transmitting control information to Antenna 0 using a second scheme, and FIG. 32 shows a method for transmitting control information to Antenna 1 using the second scheme. Referring to FIGS. 34 and 35, a modulation symbol transmitted through Antenna 0 can be transmitted in the same manner as in 1Tx transmission. On the other hand, Alamouti coding for use in a time domain is applied to the modulation symbol transmitted through Antenna 1. That is, the Alamouti coding is applied to the same orthogonal resource in units of an SC-FDMA symbol to which OC is applied. In this case, the Alamouti coding may include not only a matrix shown in Equation 13 but also all unitary conversion formats for the matrix.

$$\text{Time domain} \downarrow \begin{pmatrix} S_0 & -(S_1)^* \\ S_1 & (S_0)^* \end{pmatrix} \xrightarrow{\text{antenna}} \quad [\text{Equation 13}]$$

In Equation 13, $(.)^*$ is denoted by a complex conjugate operation of $(.)$.

For example, in case of using an SC-FDMA symbol 0, 1, 5, or 6, the following transmission can be achieved at Slot 0 of each antenna.

Antenna 0
Through OS0, a modulation symbol (s0) is transmitted through SC-FDMA symbols 0~1 of Slot 0.
Through OS1, a modulation symbol (s1) is transmitted through SC-FDMA symbols 0~1 of Slot 0.
Through OS0, a modulation symbol (s2) is transmitted through SC-FDMA symbols 5~6 of Slot 0.
Through OS1, a modulation symbol (s3) is transmitted through SC-FDMA symbols 5~6 of Slot 0.
Antenna 1
Through OS0, a modulation symbol $-(s2)^*$ is transmitted through SC-FDMA symbols 0~1 of Slot 0.
Through OS1, a modulation symbol $-(s3)^*$ is transmitted through SC-FDMA symbols 0~1 of Slot 0.
Through OS0, a modulation symbol $(s0)^*$ is transmitted through SC-FDMA symbols 5~6 of Slot 0.
Through OS1, a modulation symbol $(s1)^*$ is transmitted through SC-FDMA symbols 5~6 of Slot 0.

In FIGS. 34 and 35, although multiple orthogonal resources allocated to the first antenna are different from multiple orthogonal resources allocated to the second antenna for convenience of description and index assignment reasons, the scope or spirit of the present invention is not limited thereto, and can also be applied to other examples as necessary. Multiple orthogonal resources allocated to the first antenna are actually identical to multiple orthogonal resources allocated to the second antenna.

A transmission diversity or spatial multiplexing scheme in which a modulation symbol is transmitted through different orthogonal resources at each antenna according to a third transmission diversity scheme will hereinafter be described in detail. That is, two orthogonal resources corresponding to the number of antennas can be further allocated, and the same information can be transmitted using the same format through individual resources. In this case, after joint coding is performed considering the extended symbol space, different modulation symbols are transmitted through individual orthogonal resources, so that spatial multiplexing can be achieved.

Figure 36:
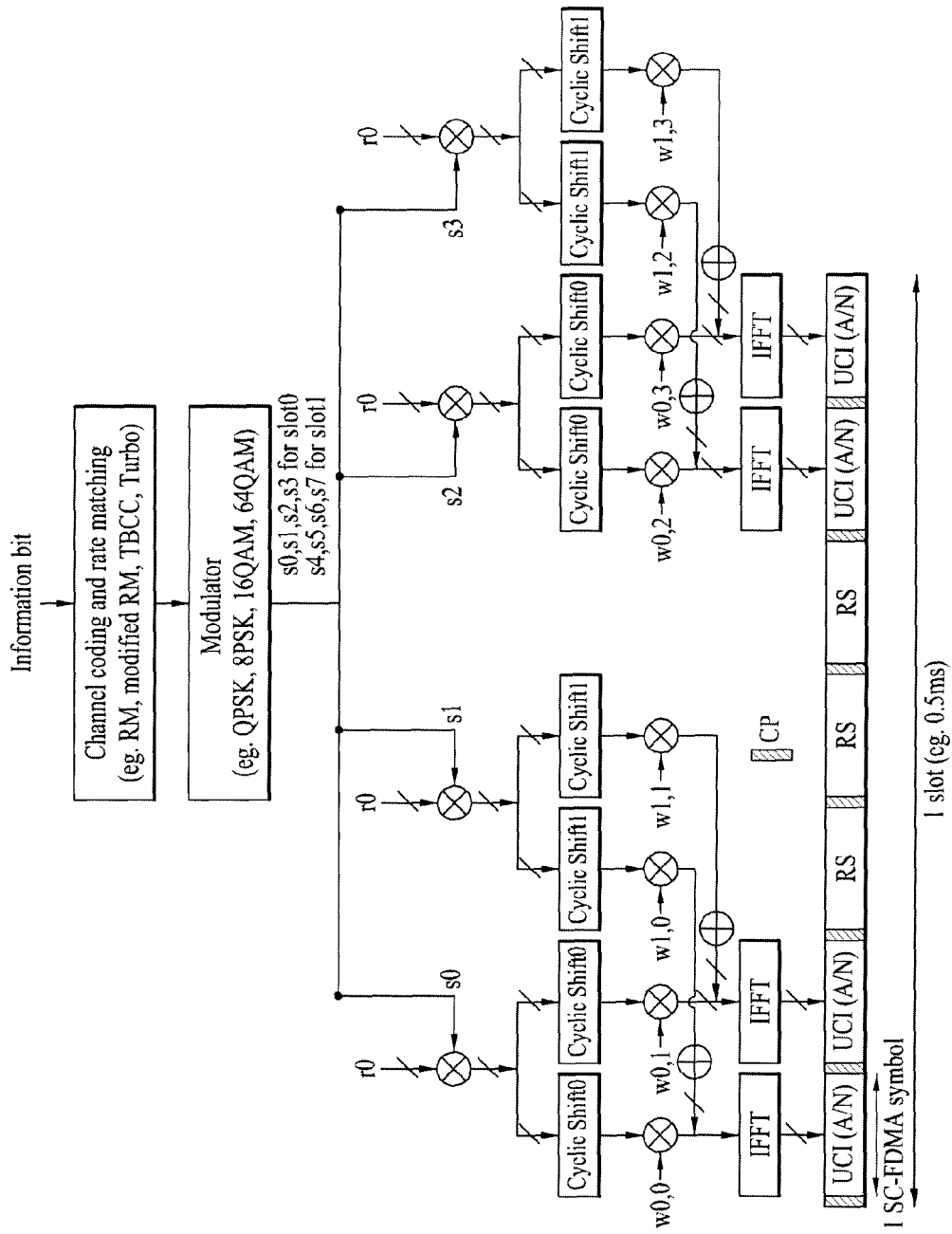
FIGS. 36 and 37 exemplarily show a transmission diversity method according to another embodiment of the present invention.
Figure 37:
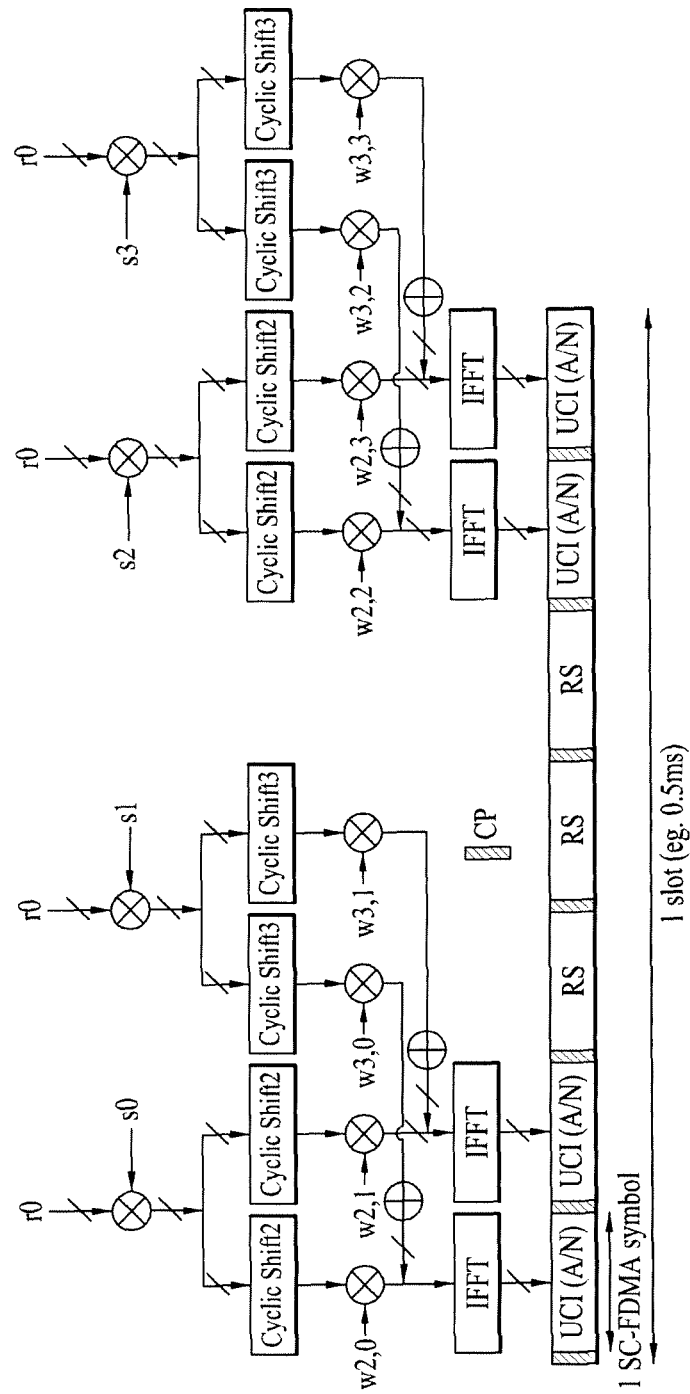

FIG. 36 shows a method for transmitting control information to Antenna 0 using a third transmit diversity scheme, and FIG. 37 shows a method for transmitting control information to Antenna 1 using the third transmission diversity scheme. Resources allocated for the second antenna may be defined as an offset value of a resource used in the first antenna, and the offset value may be set to 1. In relation to a CCE index, the smallest CCE index may be used for the first antenna, and the next CCE index may be used for the second antenna. If a DL grant PDCCH has a CCE aggregation level of 2 or more, the DL grant PDCCH can be efficiently used without resource consumption.

For example, in case of using an SC-FDMA symbol 0, 1, 5, or 6, the following transmission can be achieved at Slot 0 of each antenna.

Antenna 0
  Through OS0_0, a modulation symbol (s0) is transmitted through SC-FDMA symbols 0~1 of Slot 0.
  Through OS1_0, a modulation symbol (s1) is transmitted through SC-FDMA symbols 0~1 of Slot 0.
  Through OS0_0, a modulation symbol (s2) is transmitted through SC-FDMA symbols 5~6 of Slot 0.
  Through OS1_0, a modulation symbol (s3) is transmitted through SC-FDMA symbols 5~6 of Slot 0.

Antenna 1
  Through OS0_1, a modulation symbol (s0) is transmitted through SC-FDMA symbols 0~1 of Slot 0.
  Through OS1_1, a modulation symbol (s1) is transmitted through SC-FDMA symbols 0~1 of Slot 0.
  Through OS0_1, a modulation symbol (s2) is transmitted through SC-FDMA symbols 5~6 of Slot 0.
  Through OS1_1, a modulation symbol (s3) is transmitted through SC-FDMA symbols 5~6 of Slot 0.

In case of using the spatial multiplexing scheme, modulation symbols s0~s3 transmitted at Antenna 0 have information different from those of modulation symbols s0~s3 transmitted at Antenna 1.

Figure 38:
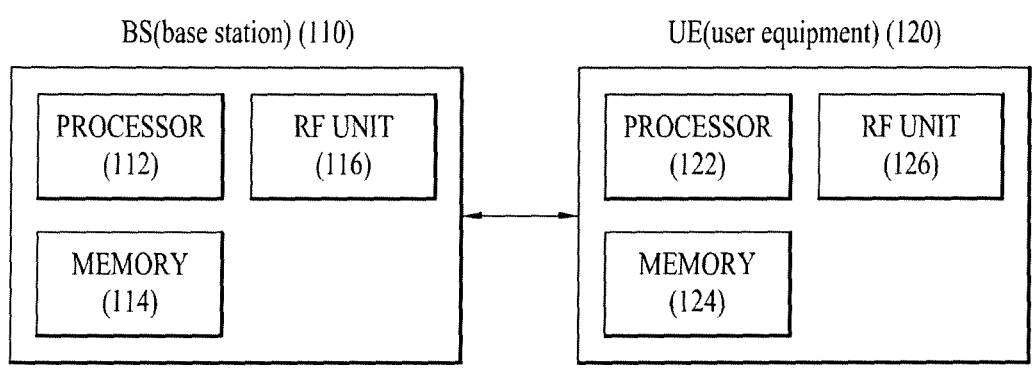
FIG. 38 is a block diagram illustrating a base station (BS) and a user equipment (UE) applicable to embodiments of the present invention.

FIG. 38 is a block diagram illustrating a base station (BS) and a user equipment (UE) applicable to embodiments of the present invention.

Referring to FIG. 38, the wireless communication system includes a base station (BS) 110 and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the eNB (or BS) as the case may be. In other words, it will be apparent that various operations performed for communication with the UE in the network which includes a plurality of network nodes along with the eNB (or BS) can be performed by the BS or network nodes other than the eNB (or BS). The term eNB (or BS) may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to a user equipment (UE), a base station (BS), and other devices. In more detail, the present invention can be applied to a method and apparatus for transmitting uplink control information.

The invention claimed is:

1. A method for transmitting control information through a Physical Uplink Control Channel (PUCCH) by a user equipment (UE) in a wireless communication system, the UE having a plurality of antenna ports including a first antenna port and a second antenna port, the method comprising:
    obtaining a modulation symbol from the control information;
    spreading the modulation symbol using a first cyclic shift and a first orthogonal sequence to obtain first spread modulation symbols for the first antenna port;
    spreading the modulation symbol spread using a second cyclic shift and a second orthogonal sequence to obtain second spread modulation symbols for the second antenna port;
    obtaining an additional modulation symbol from the control information;
    spreading the additional modulation symbol using a third cyclic shift and a third orthogonal sequence to obtain third spread modulation symbols for the first antenna port;
    transmitting the first and third spread modulation symbols via a first PUCCH on the first antenna port and the second spread modulation symbols via a second PUCCH on the second antenna port,
    wherein the first and third spread modulation symbols and the second spread modulation symbols are transmitted in a same slot,
    wherein the third spread modulation symbols are mapped to a same physical resource block with the first spread modulation symbols,
    wherein each of the first and second cyclic shifts and each of the first and second orthogonal sequences are determined based on PUCCH resource index information for each antenna port,
    wherein PUCCH resource index information for the first antenna port is determined by a lowest control channel element (CCE) index used for a physical downlink control channel (PDCCH) transmission, and
    wherein PUCCH resource index information for the second antenna port is obtained by adding 1 to a value of the PUCCH resource index information for the first antenna port.

2. The method according to claim 1, wherein said spreading the modulation symbol includes:
    cyclic shifting the modulation symbol by a corresponding cyclic shift from among the first cyclic shift and the second cyclic shift, and
    multiplying the cyclic shifted modulation symbol by a corresponding orthogonal sequence from among the first orthogonal sequence and the second orthogonal sequence.

3. The method according to claim 1, wherein the first cyclic shift is same as the second cyclic shift.

4. The method according to claim 1, wherein the first cyclic shift is different from the second cyclic shift.

5. The method according to claim 1, wherein the first orthogonal sequence is same as the second orthogonal sequence.

6. The method according to claim 1, further comprising:
    spreading the additional modulation symbol using a fourth cyclic shift and a fourth orthogonal sequence to obtain fourth spread modulation symbols for the second antenna port;
    transmitting the fourth spread modulation symbols via the second PUCCH on the second antenna port;
    wherein the fourth spread modulation symbols are mapped to a same physical resource block with the second spread modulation symbols.

7. A user equipment (UE) configured to transmit control information through a physical uplink control channel (PUCCH) in a wireless communication system comprising:
    a plurality of antenna ports including a first antenna port and a second antenna port;
    a radio frequency (RF) device; and
    a processor,
    wherein the processor is configured to:
    obtain a modulation symbol from the control information;
    spread the modulation symbol using a first cyclic shift and a first orthogonal sequence to obtain first spread modulation symbols for the first antenna port;
    spread the modulation symbol spread using a second cyclic shift and a second orthogonal sequence to obtain second spread modulation symbols for the second antenna port;
    obtain an additional modulation symbol from the control information;
    spread the additional modulation symbol using a third cyclic shift and a third orthogonal sequence to obtain third spread modulation symbols for the first antenna port;
    transmit the first and third spread modulation symbols via a first PUCCH on the first antenna port and the second spread modulation symbols via a second PUCCH on the second antenna port,
    wherein the first and third spread modulation symbols and the second spread modulation symbols are transmitted in a same slot,
    wherein the third spread modulation symbols are mapped to a same physical resource block with the first spread modulation symbols,
    wherein each of the first and second cyclic shifts and each of the first and second orthogonal sequences are determined based on PUCCH resource index information for each antenna port,
    wherein PUCCH resource index information for the first antenna port is determined by a lowest control channel element (CCE) index used for a physical downlink control channel (PDCCH) transmission, and
    wherein PUCCH resource index information for the second antenna port is obtained by adding 1 to a value of the PUCCH resource index information for the first antenna port.

8. The user equipment (UE) according to claim 7, wherein said spreading the modulation symbol includes:
    cyclic shifting the modulation symbol by a corresponding cyclic shift from among the first cyclic shift and the second cyclic shift, and
    multiplying the cyclic shifted modulation symbol by a corresponding orthogonal sequence from among the first orthogonal sequence and the second orthogonal sequence.

9. The user equipment (UE) according to claim 7, wherein the first cyclic shift is same as the second cyclic shift.

10. The user equipment (UE) according to claim 7, wherein the first cyclic shift is different from the second cyclic shift.

11. The user equipment (UE) according to claim 7, wherein the first orthogonal sequence is same as the second orthogonal sequence.

12. The user equipment (UE) according to claim 7, wherein the processor is further configured to:
spread the additional modulation symbol using a fourth cyclic shift and a fourth orthogonal sequence to obtain fourth spread modulation symbols for the second antenna port, and
transmit the fourth spread modulation symbols via the second PUCCH on the second antenna port,
wherein the fourth spread modulation symbols are mapped to a same physical resource block with the second spread modulation symbols.

13. The method according to claim 1, wherein the first orthogonal sequence is different from the second orthogonal sequence.

14. The user equipment (UE) according to claim 7, wherein the first orthogonal sequence is different from the second orthogonal sequence.

* * * * *